（12） United States Patent
Elshafie et al.

(10) Patent No.: US 11,737,008 B2
(45) Date of Patent: Aug. 22, 2023

(54) RELAYING AND RELATED CONFIGURATION SIGNALING FOR WIRELESS COMMUNICATIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/488,101

(22) Filed: Sep. 28, 2021

(65) Prior Publication Data

US 2022/0104101 A1 Mar. 31, 2022

Related U.S. Application Data

(60) Provisional application No. 63/084,719, filed on Sep. 29, 2020.

(51) Int. Cl.
*H04W 40/22* (2009.01)
*H04W 72/20* (2023.01)

(52) U.S. Cl.
CPC .......... *H04W 40/22* (2013.01); *H04W 72/20* (2023.01)

(58) Field of Classification Search
CPC ...... H04W 40/22; H04W 72/20; H04W 88/04
See application file for complete search history.

(56) References Cited

U.S. PATENT DOCUMENTS

| | | | |
|---|---|---|---|
| 2020/0092685 A1* | 3/2020 | Fehrenbach | H04W 72/23 |
| 2022/0030493 A1* | 1/2022 | Hong | H04W 36/305 |
| 2023/0020973 A1* | 1/2023 | Fujishiro | H04W 28/0252 |

* cited by examiner

*Primary Examiner* — Hashim S Bhatti
(74) *Attorney, Agent, or Firm* — Holland & Hart LLP

(57) ABSTRACT

Methods, systems, and devices for wireless communications are described. A wireless device may configure a relay configuration for a set of user equipments (UEs). The relay configuration may include a set of first direction transmission opportunities and corresponding second direction transmission opportunities. The relay configuration may be activated or deactivated, such as on a packet-by-packet basis. When the relay configuration is activated, a first UE and one or more second UEs may sequentially transmit a packet using the first direction transmission opportunities so as to be receivable by the wireless device and each other. The relay process may continue, for example, until the wireless device successfully receives the packet. The wireless device may monitor the first direction transmission opportunities and transmit positive or negative acknowledgments during the second direction transmission opportunities to indicate whether it has successfully received the packet.

30 Claims, 17 Drawing Sheets

RELAYING AND RELATED CONFIGURATION SIGNALING FOR WIRELESS COMMUNICATIONS

CROSS REFERENCE

The present application for patent claims the benefit of U.S. Provisional Patent Application No. 63/084,719 by ELSHAFIE et al., entitled "UPLINK RELAYING AND RELATED CONFIGURATION SIGNALING" and filed Sep. 29, 2020, which is assigned to the assignee hereof and expressly incorporated by reference herein.

TECHNICAL FIELD

The following relates to wireless communications, including relaying and related configuration signaling for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A base station may be capable of communicating with a UE over transmitted downlink communications and received uplink communications.

SUMMARY

The described techniques relate to improved methods, systems, devices, and apparatuses that support relaying and related configuration signaling for wireless communications. Generally, the described techniques provide for relayed uplink communications based on a relay configuration. The relay configuration may, for example, be configured based on semi-persistently scheduled resources (e.g., scheduled or otherwise configured via radio resource control (RRC) signaling or media access controller (MAC) control elements (MAC-CEs)) and activated or deactivated (e.g., released) for a given uplink packet based on dynamic signaling (e.g., downlink control information (DCI)). For example, a set of first direction (e.g., uplink) transmission opportunities (e.g., data channel occasions such as physical uplink data channel occasions) may be semi-persistently scheduled for a set of user equipments (UEs), along with a corresponding set of second direction (e.g., downlink) transmission opportunities (e.g., control channel occasions such as physical downlink control channel occasions). The scheduling information for the relay configuration may include a periodicity parameter (which may be referred to herein as p) related to the periodicity or temporal separation between the first direction transmission opportunities and an offset parameter (which may be referred to herein as K) related to the temporal separation between a first direction (e.g., uplink) transmission opportunity and a corresponding second direction (e.g., downlink) transmission opportunity.

When the relay configuration is activated for a packet, a source UE for the data packet may transmit the data packet to a wireless device (e.g., a base station) and one or more relay UEs during one of the first direction (e.g., uplink) transmission opportunities, the source UE and the one or more relay UEs included in the set of UEs for which the relay configuration was configured (e.g., by the base station). The wireless device may transmit hybrid automatic repeat request (HARD) feedback (e.g., a positive acknowledgement (ACK), a negative acknowledgement (NACK)) during the second direction (e.g., downlink) transmission opportunity corresponding to the first direction (e.g., uplink) transmission opportunity based on whether the wireless device is able to successfully receive or decode the data packet as transmitted by the source UE. For example, if the wireless device successfully receives and decodes the data packet as transmitted by the source UE, the wireless device may transmit an ACK to the source UE and the relay UEs, and the relay process may cease (e.g., the relay configuration may be deactivated).

If, however, the wireless device does not successfully receive and decode the data packet based on the transmission by the source UE (e.g., based on monitoring the associated first direction transmission opportunity), the wireless device may transmit a NACK to the source UE and the relay UEs during the second direction (e.g., downlink) transmission opportunity corresponding to the first direction (e.g., uplink) transmission opportunity used by the source UE. A first relay UE, having previously received the data packet from the source UE, may transmit the same data packet to the wireless device (and to one or more other relay UEs, and possibly in a way that may also be received by the source UE). For example, the first relay UE may be between the wireless device and the source UE or otherwise more likely to successfully transmit the data packet to the wireless device relative to the source UE (e.g., based on favorable channel conditions). If the wireless device successfully receives and decodes the data packet as transmitted by the first relay UE, the wireless device may transmit an ACK to the source UE and the relay UEs, and the relay process may cease.

If, however, the wireless device does not successfully receive and decode the data packet based on the transmission by the first relay UE (e.g., based on monitoring the associated first direction transmission opportunity), the wireless device may transmit a NACK to the source UE and the relay UEs during the second direction (e.g., downlink) transmission opportunity corresponding to the first direction (e.g., uplink) transmission opportunity used by the first relay UE. In such cases, the relay process may remain activated across any number (quantity) of relay UEs until the wireless device transmits an ACK for the data packet or, in some cases, until a maximum number of transmission attempts for the data packet have been made. In some cases, if all relay UEs have attempted a first direction (e.g., uplink) transmission for a given packet, the relay process may continue by cycling back through the source UE and any quantity of the relay UEs, or in some cases a set of UEs that excludes the source UE, as other UEs may have successfully obtained the packet based on one more prior transmissions thereof.

A method of wireless communication at a wireless device (e.g., base station) is described. The method may include transmitting, to a set of UEs, an indication of a relay configuration for the set of UEs, the relay configuration associated with a set of physical data channel occasions and a corresponding set of physical control channel occasions, where each physical data channel occasion of the set of physical data channel occasions is assigned to a respective UE of the set of UEs, and where the set of UEs includes a first UE for transmitting a data packet and one or more second UEs for relaying the data packet, monitoring one or more physical data channel occasions of the set of physical data channel occasions after transmitting the indication of the relay configuration, receiving, based on the monitoring, the data packet from a UE of the set of UEs during a physical data channel occasion of the set of physical data channel occasions, and transmitting, based on receiving the data packet, a positive acknowledgement for the data packet to the set of UEs during a physical control channel occasion of the set of physical control channel occasions, the physical control channel occasion corresponding to the physical data channel occasion, where the positive acknowledgement indicates that the relay configuration is deactivated for the data packet.

An apparatus for wireless communication at a wireless device (e.g., base station) is described. The apparatus may include at least one processor, memory coupled with (e.g., operatively, communicatively, functionally, electronically, or electrically) the at least one processor, and instructions stored in the memory. The instructions may be executable by the processor to cause the apparatus to transmit, to a set of UEs, an indication of a relay configuration for the set of UEs, the relay configuration associated with a set of physical data channel occasions and a corresponding set of physical control channel occasions, where each physical data channel occasion of the set of physical data channel occasions is assigned to a respective UE of the set of UEs, and where the set of UEs includes a first UE for transmitting a data packet and one or more second UEs for relaying the data packet, monitor one or more physical data channel occasions of the set of physical data channel occasions after transmitting the indication of the relay configuration, receive, based on the monitoring, the data packet from a UE of the set of UEs during a physical data channel occasion of the set of physical data channel occasions, and transmit, based on receiving the data packet, a positive acknowledgement for the data packet to the set of UEs during a physical control channel occasion of the set of physical control channel occasions, the physical control channel occasion corresponding to the physical data channel occasion, where the positive acknowledgement indicates that the relay configuration is deactivated for the data packet.

Another apparatus for wireless communication at a wireless device (e.g., base station) is described. The apparatus may include means for transmitting, to a set of UEs, an indication of a relay configuration for the set of UEs, the relay configuration associated with a set of physical data channel occasions and a corresponding set of physical control channel occasions, where each physical data channel occasion of the set of physical data channel occasions is assigned to a respective UE of the set of UEs, and where the set of UEs includes a first UE for transmitting a data packet and one or more second UEs for relaying the data packet, monitoring one or more physical data channel occasions of the set of physical data channel occasions after transmitting the indication of the relay configuration, receiving, based on the monitoring, the data packet from a UE of the set of UEs during a physical data channel occasion of the set of physical data channel occasions, and transmitting, based on receiving the data packet, a positive acknowledgement for the data packet to the set of UEs during a physical control channel occasion of the set of physical control channel occasions, the physical control channel occasion corresponding to the physical data channel occasion, where the positive acknowledgement indicates that the relay configuration is deactivated for the data packet.

A non-transitory computer-readable medium storing code for wireless communication at a wireless device (e.g., base station) is described. The code may include instructions executable by at least one processor to transmit, to a set of UEs, an indication of a relay configuration for the set of UEs, the relay configuration associated with a set of physical data channel occasions and a corresponding set of physical control channel occasions, where each physical data channel occasion of the set of physical data channel occasions is assigned to a respective UE of the set of UEs, and where the set of UEs includes a first UE for transmitting a data packet and one or more second UEs for relaying the data packet, monitor one or more physical data channel occasions of the set of physical data channel occasions after transmitting the indication of the relay configuration, receive, based on the monitoring, the data packet from a UE of the set of UEs during a physical data channel occasion of the set of physical data channel occasions, and transmit, based on receiving the data packet, a positive acknowledgement for the data packet to the set of UEs during a physical control channel occasion of the set of physical control channel occasions, the physical control channel occasion corresponding to the physical data channel occasion, where the positive acknowledgement indicates that the relay configuration is deactivated for the data packet.

In some examples of the method, apparatuses, and non-transitory computer-readable medium described herein, transmitting the indication of the relay configuration may include operations, features, means, or instructions for transmitting semi-persistent scheduling information for the set of physical data channel occasions, the set of physical control channel occasions, or both.

In some examples of the method, apparatuses, and non-transitory computer-readable medium described herein, transmitting the scheduling information may include operations, features, means, or instructions for transmitting an indication of a periodicity associated with the set of physical data channel occasions, an indication of a temporal spacing between each physical data channel occasion of the set of physical data channel occasions and a corresponding physical control channel occasion of the set of physical control channel occasions, or both.

Some examples of the method, apparatuses, and non-transitory computer-readable medium described herein may further include operations, features, means, or instructions for identifying a priority associated with the data packet, where the periodicity may be based on the priority.

In some examples of the method, apparatuses, and non-transitory computer-readable medium described herein, transmitting the scheduling information may include operations, features, means, or instructions for transmitting a radio resource control message or a media access control-control element that includes at least a portion of the scheduling information.

In some examples of the method, apparatuses, and non-transitory computer-readable medium described herein, the scheduling information includes an indication of a quantity of iterations for relaying the data packet, each iteration of the quantity of iterations including a respective attempt to transmit the data packet by each UE of the set of UEs.

In some examples of the method, apparatuses, and non-transitory computer-readable medium described herein, transmitting the positive acknowledgement includes broadcasting or group casting the positive acknowledgement to the set of UEs.

Some examples of the method, apparatuses, and non-transitory computer-readable medium described herein may further include operations, features, means, or instructions for transmitting to the set of UEs, after transmitting the indication of the relay configuration, an activation message for the relay configuration and the data packet, and commencing the monitoring after transmitting the activation message.

In some examples of the method, apparatuses, and non-transitory computer-readable medium described herein, the activation message includes a control information message configured to activate the relay configuration for the set of UEs.

In some examples of the method, apparatuses, and non-transitory computer-readable medium described herein, the activation message may be in accordance with a control information format dedicated to activation messages for relay configurations.

In some examples of the method, apparatuses, and non-transitory computer-readable medium described herein, transmitting the activation message comprises broadcasting or group casting the activation message to the set of UEs.

In some examples of the method, apparatuses, and non-transitory computer-readable medium described herein, transmitting the indication of the relay configuration to the set of UEs may include operations, features, means, or instructions for transmitting the indication of the relay configuration to a superset of UEs that includes the set of UEs and one or more additional UEs, and the activation message includes an indication of the set of UEs, the one or more second UEs for relaying the data packet, or both.

In some examples of the method, apparatuses, and non-transitory computer-readable medium described herein, the activation message includes an indication of a relay order for relaying the data packet by the one or more second UEs, the relay order corresponding to an order of transmission for the one or more second UEs.

In some examples of the method, apparatuses, and non-transitory computer-readable medium described herein, the activation message includes an indication of a quantity of iterations for relaying the data packet by the one or more second UEs, each iteration of the quantity of iterations including a respective attempt to transmit the data packet by each UE of the set of UEs.

In some examples of the method, apparatuses, and non-transitory computer-readable medium described herein, the activation message includes a scheduling grant for the set of physical data channel occasions.

Some examples of the method, apparatuses, and non-transitory computer-readable medium described herein may further include operations, features, means, or instructions for selecting, from a set of relay modes, a relay mode for the one or more second UEs, where the activation message includes an indication of the relay mode for the one or more second UEs.

In some examples of the method, apparatuses, and non-transitory computer-readable medium described herein, the relay mode includes a first relay mode according to which a second UE of the one or more second UEs may be to relay the data packet during a respective physical data channel occasion for the second UE based on a successful decode of the data packet by the second UE during a prior physical data channel occasion.

In some examples of the method, apparatuses, and non-transitory computer-readable medium described herein, the relay mode includes a second relay mode according to which a second UE of the one or more second UEs may be to relay signaling received by the second UE during a prior physical data channel occasion without attempting to decode the received signaling.

Some examples of the method, apparatuses, and non-transitory computer-readable medium described herein may further include operations, features, means, or instructions for selecting, from a set of relay modes, a respective relay mode for each second UE of the one or more second UEs, where the activation message includes an indication of the respective relay mode for each second UE.

Some examples of the method, apparatuses, and non-transitory computer-readable medium described herein may further include operations, features, means, or instructions for receiving, from each second UE, a respective indication of a capability of the second UE to operate in accordance with one or more relay modes of the set of relay modes, where selecting the respective relay mode for the second UE may be based on the respective indication of the capability of the second UE.

Some examples of the method, apparatuses, and non-transitory computer-readable medium described herein may further include operations, features, means, or instructions for transmitting, based on receiving the data packet, a second activation message for the relay configuration and a second data packet.

Some examples of the method, apparatuses, and non-transitory computer-readable medium described herein may further include operations, features, means, or instructions for failing to successfully decode the data packet after a set of physical data channel occasions that includes a respective physical data channel occasion for each UE of the set of UEs, and transmitting, based on failing to successfully decode the data packet after the set of physical data channel occasions, a second activation message for the relay configuration and the data packet.

Some examples of the method, apparatuses, and non-transitory computer-readable medium described herein may further include operations, features, means, or instructions for transmitting, after transmitting the activation message, a second activation message for the relay configuration, where the second activation message may be for a second data packet or the data packet, and where the second activation message indicates a different order of transmission for the one or more second UEs, a different set of UEs, or both relative to the activation message.

In some examples of the method, apparatuses, and non-transitory computer-readable medium described herein, the different set of UEs excludes the first UE.

Some examples of the method, apparatuses, and non-transitory computer-readable medium described herein may further include operations, features, means, or instructions for receiving signaling from the first UE during a first physical data channel occasion of the set of physical data channel occasions, the first physical data channel occasion before the physical data channel occasion during which the wireless device receives the data packet, failing to obtain the data packet based on the signaling received from the first UE during the first physical data channel occasion, and transmitting, based on failing to obtain the data packet based on the signaling received from the first UE during the first physical data channel occasion, a negative acknowledgement for the data packet to the set of UEs during a first physical control channel occasion of the set of physical control channel occasions, where the first physical control channel occasion corresponds to the first physical data channel occasion, and where the negative acknowledgement indicates that the relay configuration remains activated for the data packet.

Some examples of the method, apparatuses, and non-transitory computer-readable medium described herein may further include operations, features, means, or instructions for receiving signaling from a first second UE of the one or more second UEs during a second physical data channel occasion of the set of physical data channel occasions, the second physical data channel occasion between the first physical data channel occasion and the physical data channel occasion during which the wireless device receives the data packet, failing to obtain the data packet based on the signaling received from the first second UE during the second physical data channel occasion, and transmitting, based on failing to obtain the data packet based on the signaling received from the first second UE during the second physical data channel occasion, a second negative acknowledgement for the data packet to the set of UEs during a second physical control channel occasion of the set of physical control channel occasions, where the second physical control channel occasion corresponds to the second physical data channel occasion, and where second negative acknowledgement indicates that the relay configuration remains activated for the data packet.

In some examples of the method, apparatuses, and non-transitory computer-readable medium described herein, transmitting the negative acknowledgement comprises broadcasting or group casting the negative acknowledgement to the set of UEs.

Some examples of the method, apparatuses, and non-transitory computer-readable medium described herein may further include operations, features, means, or instructions for performing soft combining based on the signaling received from the first UE during the first physical data channel occasion and the signaling received from the first second UE during the second physical data channel occasion, and attempting to obtain the data packet based on the soft combining.

A method of wireless communication at a first UE is described. The method may include receiving, from a wireless device, an indication of a relay configuration for a set of UEs that includes the first UE and one or more second UEs for relaying a data packet, where the relay configuration is associated with a set of physical data channel occasions and a corresponding set of physical control channel occasions, and where each physical data channel occasion of the set of physical data channel occasions is assigned to a respective UE of the set of UEs, transmitting, during a first physical data channel occasion of the set of physical data channel occasions, the data packet to the wireless device and the one or more second UEs based on the relay configuration, and receiving, from the wireless device, a positive acknowledgement for the data packet during a physical control channel occasion of the set of physical control channel occasions, where the positive acknowledgement indicates that the relay configuration is deactivated for the data packet.

An apparatus for wireless communication at a first UE is described. The apparatus may include at least one processor, memory coupled with (e.g., operatively, communicatively, functionally, electronically, or electrically) the at least one processor, and instructions stored in the memory. The instructions may be executable by the processor to cause the apparatus to receive, from a wireless device, an indication of a relay configuration for a set of UEs that includes the first UE and one or more second UEs for relaying a data packet, where the relay configuration is associated with a set of physical data channel occasions and a corresponding set of physical control channel occasions, and where each physical data channel occasion of the set of physical data channel occasions is assigned to a respective UE of the set of UEs, transmit, during a first physical data channel occasion of the set of physical data channel occasions, the data packet to the wireless device and the one or more second UEs based on the relay configuration, and receive, from the wireless device, a positive acknowledgement for the data packet during a physical control channel occasion of the set of physical control channel occasions, where the positive acknowledgement indicates that the relay configuration is deactivated for the data packet.

Another apparatus for wireless communication at a first UE is described. The apparatus may include means for receiving, from a wireless device, an indication of a relay configuration for a set of UEs that includes the first UE and one or more second UEs for relaying a data packet, where the relay configuration is associated with a set of physical data channel occasions and a corresponding set of physical control channel occasions, and where each physical data channel occasion of the set of physical data channel occasions is assigned to a respective UE of the set of UEs, transmitting, during a first physical data channel occasion of the set of physical data channel occasions, the data packet to the wireless device and the one or more second UEs based on the relay configuration, and receiving, from the wireless device, a positive acknowledgement for the data packet during a physical control channel occasion of the set of physical control channel occasions, where the positive acknowledgement indicates that the relay configuration is deactivated for the data packet.

A non-transitory computer-readable medium storing code for wireless communication at a first UE is described. The code may include instructions executable by at least one processor to receive, from a wireless device, an indication of a relay configuration for a set of UEs that includes the first UE and one or more second UEs for relaying a data packet, where the relay configuration is associated with a set of physical data channel occasions and a corresponding set of physical control channel occasions, and where each physical data channel occasion of the set of physical data channel occasions is assigned to a respective UE of the set of UEs, transmit, during a first physical data channel occasion of the set of physical data channel occasions, a data packet to the wireless device and the one or more second UEs based on the relay configuration, and receive, from the wireless device, a positive acknowledgement for the data packet during a physical control channel occasion of the set of physical control channel occasions, where the positive acknowledgement indicates that the relay configuration is deactivated for the data packet.

In some examples of the method, apparatuses, and non-transitory computer-readable medium described herein, receiving the indication of the relay configuration may include operations, features, means, or instructions for receiving semi-persistent scheduling information for the set of physical data channel occasions, the set of physical control channel occasions, or both.

In some examples of the method, apparatuses, and non-transitory computer-readable medium described herein, receiving the scheduling information may include operations, features, means, or instructions for receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

In some examples of the method, apparatuses, and non-transitory computer-readable medium described herein, receiving the scheduling information may include operations, features, means, or instructions for receiving a radio resource control message or a media access control-control element that includes at least a portion of the scheduling information.

Some examples of the method, apparatuses, and non-transitory computer-readable medium described herein may further include operations, features, means, or instructions for receiving from the wireless device, after receiving the indication of the relay configuration, an activation message for the relay configuration and the data packet, where transmitting the data packet may be based on receiving the activation message.

In some examples of the method, apparatuses, and non-transitory computer-readable medium described herein, the activation message includes a control information message configured to activate the relay configuration for the set of UEs.

In some examples of the method, apparatuses, and non-transitory computer-readable medium described herein, the activation message may be in accordance with a control information format dedicated to activation messages for relay configurations.

In some examples of the method, apparatuses, and non-transitory computer-readable medium described herein, the activation message includes an indication of a quantity of iterations for relaying the data packet, each iteration of the quantity of iterations including a respective attempt to transmit the data packet by each UE of the set of UEs.

In some examples of the method, apparatuses, and non-transitory computer-readable medium described herein, the activation message includes a scheduling grant for the first UE to transmit the data packet during the first physical data channel occasion.

Some examples of the method, apparatuses, and non-transitory computer-readable medium described herein may further include operations, features, means, or instructions for receiving a second activation message for the relay configuration and a second data packet.

Some examples of the method, apparatuses, and non-transitory computer-readable medium described herein may further include operations, features, means, or instructions for receiving, for each of the one or more second UEs, a negative acknowledgement for a corresponding physical data channel occasion of the set of physical data channel occasions, and receiving, after receiving the negative acknowledgement for the corresponding physical data channel occasion for each of the one or more second UEs, a second activation message for the relay configuration and the data packet.

Some examples of the method, apparatuses, and non-transitory computer-readable medium described herein may further include operations, features, means, or instructions for receiving, from the wireless device, a negative acknowledgement for the data packet during a first physical control channel occasion of the set of physical control channel occasions, where the first physical control channel occasion corresponds to the first physical data channel occasion, and where negative acknowledgement indicates that the relay configuration remains activated for the data packet.

A method of wireless communication at a second UE is described. The method may include receiving, from a wireless device, an indication of a relay configuration for a set of UEs that includes a first UE for transmitting a data packet and one or more second UEs for relaying the data packet, the second UE included in the one or more second UEs, where the relay configuration is associated with a set of physical data channel occasions and a corresponding set of physical control channel occasions, and where each physical data channel occasion of the set of physical data channel occasions is assigned to a respective UE of the set of UEs, receiving, from the first UE or a another second UE of the one or more second UEs, first signaling associated with the data packet during a first physical data channel occasion of the set of physical data channel occasions, receiving, from the wireless device, a negative acknowledgment for the data packet during a first physical control channel occasion of the set of physical control channel occasions, the first physical control channel occasion corresponding to the first physical data channel occasion, and transmitting, to the wireless device during a second physical data channel occasion of the set of physical data channel occasions, second signaling associated with the data packet based on receiving the negative acknowledgement, where the second signaling is based on the first signaling.

An apparatus for wireless communication at a second UE is described. The apparatus may include at least one processor, memory coupled with (e.g., operatively, communicatively, functionally, electronically, or electrically) the at least one processor, and instructions stored in the memory. The instructions may be executable by the processor to cause the apparatus to receive, from a wireless device, an indication of a relay configuration for a set of UEs that includes a first UE for transmitting a data packet and one or more second UEs for relaying the data packet, the second UE included in the one or more second UEs, where the relay configuration is associated with a set of physical data channel occasions and a corresponding set of physical control channel occasions, and where each physical data channel occasion of the set of physical data channel occasions is assigned to a respective UE of the set of UEs, receive, from the first UE or another second UE of the one or more second UEs, first signaling associated with the data packet during a first physical data channel occasion of the set of physical data channel occasions, receive, from the wireless device, a negative acknowledgment for the data packet during a first physical control channel occasion of the set of physical control channel occasions, the first physical control channel occasion corresponding to the first physical data channel occasion, and transmit, to the wireless device during a second physical data channel occasion of the set of physical data channel occasions, second signaling associated with the data packet based on receiving the negative acknowledgement, where the second signaling is based on the first signaling.

Another apparatus for wireless communication at a second UE is described. The apparatus may include means for receiving, from a wireless device, an indication of a relay configuration for a set of UEs that includes a first UE for transmitting a data packet and one or more second UEs for relaying the data packet, the second UE included in the one or more second UEs, where the relay configuration is associated with a set of physical data channel occasions and a corresponding set of physical control channel occasions, and where each physical data channel occasion of the set of physical data channel occasions is assigned to a respective UE of the set of UEs, receiving, from the first UE or another second UE of the one or more second UEs, first signaling associated with the data packet during a first physical data channel occasion of the set of physical data channel occasions, receiving, from the wireless device, a negative acknowledgment for the data packet during a first physical control channel occasion of the set of physical control channel occasions, the first physical control channel occasion corresponding to the first physical data channel occasion, and transmitting, to the wireless device during a second physical data channel occasion of the set of physical data channel occasions, second signaling associated with the data packet based on receiving the negative acknowledgement, where the second signaling is based on the first signaling.

A non-transitory computer-readable medium storing code for wireless communication at a second UE is described. The code may include instructions executable by at least one processor to receive, from a wireless device, an indication of a relay configuration for a set of UEs that includes a first UE for transmitting a data packet and one or more second UEs for relaying the data packet, the second UE included in the one or more second UEs, where the relay configuration is associated with a set of physical data channel occasions and a corresponding set of physical control channel occasions, and where each physical data channel occasion of the set of physical data channel occasions is assigned to a respective UE of the set of UEs, receive, from the first UE or another second UE of the one or more second UEs, first signaling associated with the data packet during a first physical data channel occasion of the set of physical data channel occasions, receive, from the wireless device, a negative acknowledgment for the data packet during a first physical control channel occasion of the set of physical control channel occasions, the first physical control channel occasion corresponding to the first physical data channel occasion, and transmit, to the wireless device during a second physical data channel occasion of the set of physical data channel occasions, second signaling associated with the data packet based on receiving the negative acknowledgement, where the second signaling is based on the first signaling.

In some examples of the method, apparatuses, and non-transitory computer-readable medium described herein, receiving the indication of the relay configuration may include operations, features, means, or instructions for receiving semi-persistent scheduling information for the set of physical data channel occasions, the set of physical control channel occasions, or both.

In some examples of the method, apparatuses, and non-transitory computer-readable medium described herein, receiving the scheduling information may include operations, features, means, or instructions for receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

In some examples of the method, apparatuses, and non-transitory computer-readable medium described herein, receiving the scheduling information may include operations, features, means, or instructions for receiving a radio resource control message or a media access control-control element that includes at least a portion of the scheduling information.

In some examples of the method, apparatuses, and non-transitory computer-readable medium described herein, the scheduling information includes an indication of a quantity of iterations for relaying the data packet by the one or more second UEs, each iteration of the quantity of iterations including a respective attempt to transmit the data packet by each UE of the set of UEs.

Some examples of the method, apparatuses, and non-transitory computer-readable medium described herein may further include operations, features, means, or instructions for receiving from the wireless device, after receiving the indication of the relay configuration, an activation message for the relay configuration and the data packet, and monitoring one or more physical data channel occasions of the set of physical data channel occasions based on receiving the activation message, the one or more physical data channel occasions including at least the first physical data channel occasion.

In some examples of the method, apparatuses, and non-transitory computer-readable medium described herein, the activation message includes a control information message configured to activate the relay configuration for the set of UEs.

In some examples of the method, apparatuses, and non-transitory computer-readable medium described herein, the activation message may be in accordance with a control information format dedicated to activation messages for relay configurations.

In some examples of the method, apparatuses, and non-transitory computer-readable medium described herein, the activation message includes an indication of the set of UEs, the one or more second UEs for relaying the data packet, or both.

In some examples of the method, apparatuses, and non-transitory computer-readable medium described herein, the activation message includes an indication of a relay order for relaying the data packet by the one or more second UEs, where the relay order corresponds to an order of transmission for the one or more second UEs, and where transmitting the second signaling during the second physical data channel occasion may be based on the relay order.

In some examples of the method, apparatuses, and non-transitory computer-readable medium described herein, the activation message includes an indication of a quantity of iterations for relaying the data packet, each iteration of the quantity of iterations including a respective attempt to transmit the data packet by each UE of the set of UEs.

In some examples of the method, apparatuses, and non-transitory computer-readable medium described herein, the activation message includes a scheduling grant for the first UE to transmit the second signaling during the second physical data channel occasion.

In some examples of the method, apparatuses, and non-transitory computer-readable medium described herein, the activation message includes an indication that the second UE may be to relay the data packet in accordance with a first relay mode, and attempting to decode the signaling received during the first physical data channel occasion based on the indication to relay the data packet in accordance with the first relay mode, where transmitting the second signaling during the second physical data channel occasion in accordance with the first relay mode may be based on successfully decoding the signaling received during the first physical data channel occasion to obtain the data packet.

In some examples of the method, apparatuses, and non-transitory computer-readable medium described herein, the activation message includes an indication that the second UE may be to relay the data packet in accordance with a second relay mode, and refraining from attempting to decode the signaling received during the first physical data channel occasion before transmitting the second signaling during the second physical data channel occasion based on the indication to relay the data packet in accordance with the second relay mode.

Some examples of the method, apparatuses, and non-transitory computer-readable medium described herein may further include operations, features, means, or instructions for determining that a received signal power for the first signaling received during the first physical data channel occasion satisfies a threshold, where transmitting the second signaling during the second physical data channel occasion in accordance with the second relay mode may be based on the received signal power for the first signaling satisfying the threshold.

Some examples of the method, apparatuses, and non-transitory computer-readable medium described herein may further include operations, features, means, or instructions for transmitting, to the wireless device, an indication of a capability of the second UE to relay the data packet in accordance with a first relay mode, a second relay mode, or both.

Some examples of the method, apparatuses, and non-transitory computer-readable medium described herein may further include operations, features, means, or instructions for receiving, from the wireless device, a second negative acknowledgement for the data packet during a second physical control channel occasion of the set of physical control channel occasions, the second physical control channel occasion corresponding to the second physical data channel occasion, where the second negative acknowledgement indicates that the relay configuration remains activated for the data packet.

Some examples of the method, apparatuses, and non-transitory computer-readable medium described herein may further include operations, features, means, or instructions for receiving, from the wireless device, a positive acknowledgement for the data packet during a second physical control channel occasion of the set of physical control channel occasions, the second physical control channel occasion corresponding to the second physical data channel occasion, where the positive acknowledgement indicates that the relay configuration may be deactivated for the data packet.

Some examples of the method, apparatuses, and non-transitory computer-readable medium described herein may further include operations, features, means, or instructions for receiving, from at least one other second UE of the one or more second UEs, third signaling associated with the data packet during a third physical data channel occasion of the set of physical data channel occasions, the third physical data channel occasion between the first physical data channel occasion and the second physical data channel occasion, performing soft combining based on the first signaling and the third signaling, and generating the second signaling may be based on the soft combining.

DETAILED DESCRIPTION

Figure 1:
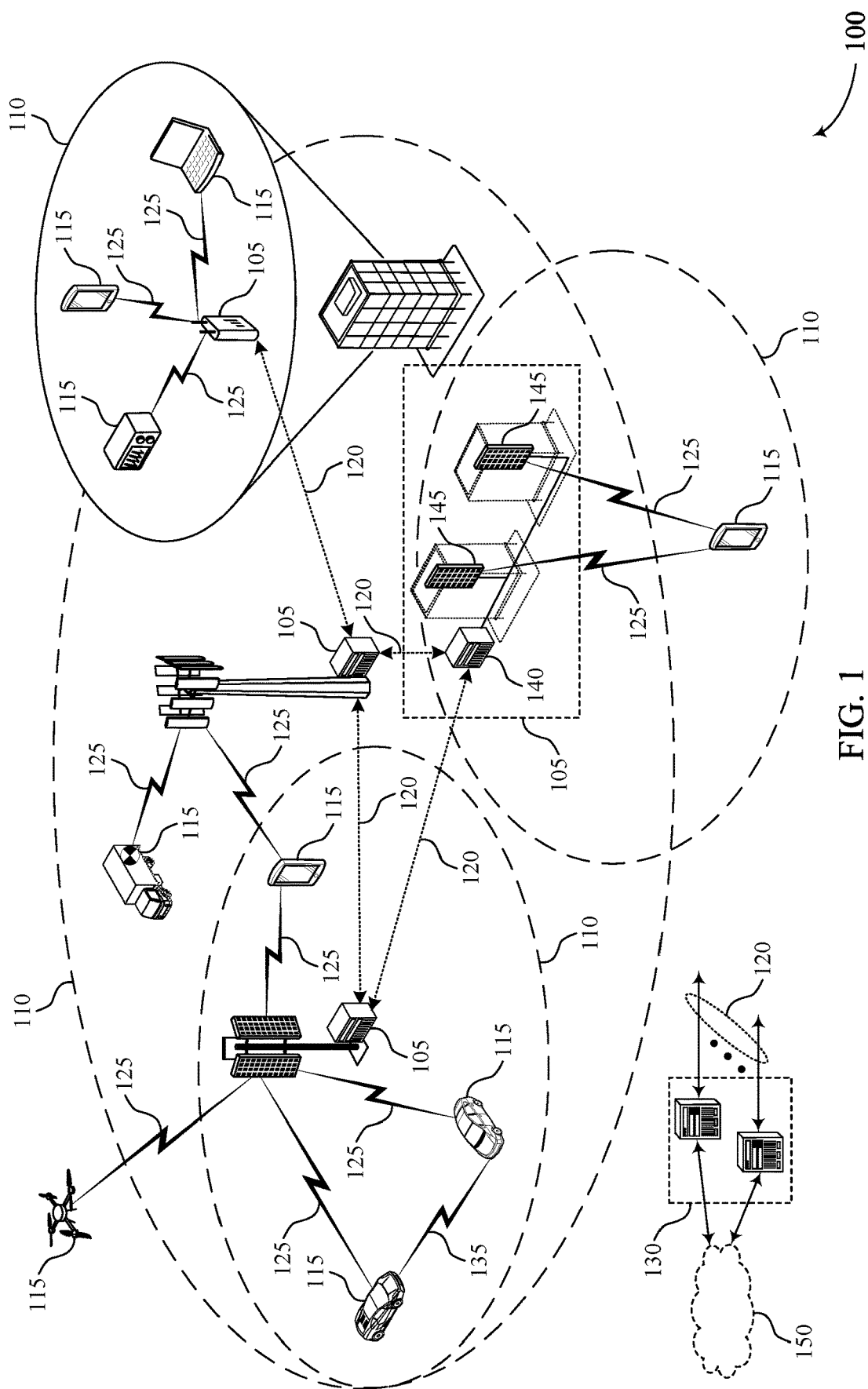
FIG. 1 illustrates an example of a system for wireless communications that supports relaying and related configuration signaling for wireless communications in accordance with aspects of the present disclosure.

In some systems, factors such as adverse channel conditions, distance between a wireless device (e.g., base station) and a user equipment (UE), or interference between the wireless device and the UE may negatively impact communications between the UE and wireless device. In some cases, the wireless device may be capable of reliably transmitting first direction (e.g., downlink) transmissions to the UE, but second direction (e.g., uplink) communications from the UE to the base station may be less reliable. For example, the wireless device may be able to transmit using a higher transmission power than the UE. Additionally, or alternatively, the wireless device may transmit control signaling to the UE in the first direction using more robust encoding schemes compared to data transmitted in the second direction by the UE.

According to examples of aspects described herein, a relay configuration including first direction (e.g., uplink) transmission opportunities for a set of UEs and corresponding second direction (e.g., downlink) transmission opportunities (e.g., hybrid automatic repeat request (HARQ) feedback opportunities) may be semi-persistently scheduled for the set of UEs. In examples where the first direction is an uplink direction and the second direction is a downlink direction, the uplink transmission opportunities may include, for example, physical uplink shared channel (PUSCH) occasions (also referred to herein as physical uplink data channel occasions). The HARQ feedback opportunities may include, for example, physical downlink control channel (PDCCH) opportunities. In some examples, the base station may transmit control signaling indicating scheduling parameters for the relay configuration, such as a periodicity p of the PUSCH occasions, temporal spacing K between each PUSCH occasion and a corresponding PDCCH occasion, or a maximum quantity of iterations for relaying a single uplink data packet. In some cases, the base station may transmit the control signaling or a portion thereof over a radio resource control (RRC) message, a media access control (MAC) control element (MAC-CE), or both.

In examples where the wireless device is a base station, the base station may activate the relay configuration for a given uplink data packet using a corresponding activation message addressed to some or all of the set of UEs associated with the relay configuration. For example, the base station may activate the relay configuration in response to a scheduling request by a source UE for the uplink data packet. The activation message may indicate one or more parameters specific to using the relay configuration for the corresponding packet. In some cases, the activation message may include a downlink control information (DCI) message. In an example, the activation message may include an indication of which UEs are to participate as relay UEs for the uplink data packet, along with the relay order associated with the participating relay UEs. In some examples, the activation message may include a quantity of iterations for relaying the uplink data transmission (e.g., according to a relay loop). Each iteration (or relay loop) may include a transmission attempt by the source UE, and transmission attempts by each participating relay UE, before the relay configuration will be deactivated for the uplink data packet, among other examples.

In an example, the base station may monitor the PUSCH occasions based on the activation of the relay configuration. The source UE may transmit an uplink data packet to the base station and one or more of the participating relay UEs. The base station may transmit HARQ feedback (e.g., a positive acknowledgement (ACK) or a negative acknowledgement (NACK)) based on whether the base station is able to successfully receive or decode the uplink data packet as transmitted by the source UE. For example, when the base station successfully receives and decodes the uplink data packet as transmitted by the source UE, the base station may transmit an ACK to the source UE and the relay UEs, and the relay process may cease. In an example, the ACK may indicate that the relay configuration is deactivated (e.g., released) for the uplink data packet.

In some cases, when the base station does not successfully receive and decode the uplink data packet, the base station may transmit a NACK to the source UE and the relay UEs. A first relay UE, having previously received the uplink data packet from the source UE, may transmit the same packet to the base station. In some examples, the first relay UE may be between the base station and the source UE or otherwise more likely to transmit the packet so as to be successfully received and decoded by the base station (e.g., due to more favorable channel conditions). In some aspects, when the base station successfully receives and decodes the uplink data packet as transmitted by the first relay UE, the base station may transmit an ACK to the source UE and the relay UEs, and the relay process may cease.

In some other cases, additional relay UEs having previously received the uplink data packet from the source UE, from a prior relay UE (e.g., from the first relay UE), or both, may transmit the uplink data packet to the base station. For example, when the base station does not successfully receive and decode the uplink data packet as transmitted by the first relay UE, the base station may transmit a second NACK to the source UE and the relay UEs, and a second relay UE may transmit the uplink data packet to the base station. In some examples, the second relay UE may be between the base station and the first relay UE. The relay process may continue across any number (quantity) of relay UEs until the base station transmits an ACK for the uplink data packet.

In some cases, the relay process may continue across until a maximum number (quantity) of transmission attempts associated with the relay process have been made. For example, the relay process may include a relay loop which may be repeated any number of times. Each iteration of the relay loop may include a respective attempt to transmit the uplink data packet by each of the source UE and the relay UEs, where the attempts by the relay UEs may be based on a relay order associated with the relay configuration.

In some examples, the relay process may include a single iteration (e.g., number of loops equals one), and the relay process may continue up to a last relay UE of the relay order associated with the relay configuration. In some other examples, the relay process may include multiple iterations (e.g., number of loops equals two or more), and the relay process may continue up to a maximum number of iterations (relay loops) for relaying the uplink data packet.

Aspects of the subject matter described herein may be implemented to realize one or more advantages. The described techniques may support improvements in spectral efficiency and reliability, among other advantages. In some aspects, utilizing the relay configuration as described herein may provide for successful data transmissions the first time a source UE transmits the data transmission (e.g., through relaying the data transmission by one or more relay UEs), which may conserve power and resources at the source UE. In some other aspects, the relay configuration may provide for reliable communications from the source UE to the wireless device (e.g., for cases where data has a relatively high priority) under adverse channel conditions. In some examples, utilizing the example relay configurations described herein may provide for enhanced coverage area for successful communications from the source UE to the wireless device, for cases in which a transmitter at the source UE would otherwise be incapable of successfully transmitting communications (e.g., due to insufficient transmission power) in the first direction to the wireless device.

Aspects of the disclosure are initially described in the context of a wireless communications system. Examples of processes and signaling exchanges that support relaying and related configuration signaling for wireless communications are then described. Aspects of the disclosure are further illustrated by and described with reference to apparatus diagrams, system diagrams, and flowcharts that relate to relaying and related configuration signaling for wireless communications. Though aspects of the disclosure are described in terms of an uplink data transmission, it is to be understood that the techniques described herein could alternatively be applied to any type of uplink transmission, or any type of downlink or sidelink transmission with the functions ascribed to UEs and base stations herein performed by any type of wireless device as appropriate for such an implementation (e.g., functions ascribed to a base station herein may be performed by a UE that is a destination for data from the source UE, using sidelink channels analogous to other uplink and downlink channels described herein).

FIG. 1 illustrates an example of a wireless communications system 100 that supports relaying and related configuration signaling for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Components within the wireless communication system 100 may be coupled (for example, operatively, communicatively, functionally, electronically, and/or electrically) to each other.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an machine-type-communication (MTC) device, which may be implemented in various articles such as appliances, drones, robots, vehicles, or meters.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems may support semi-persistent scheduling for downlink communications (e.g., for physical downlink shared channel (PDSCH) configurations). In some systems, a base station 105 may configure a UE 115 with an semi-persistent scheduling configuration including a set of recurring PDSCH occasions and a set of corresponding physical uplink control channel (PUCCH) occasions (e.g., for HARQ-ACK transmission by the UE 115). In some cases, the base station 105 may configure the SPS using control signaling (e.g., RRC messages), and the base station 105 may schedule the PDSCH occasions via control information (e.g., DCI messages). In some cases, the SPS configuration may include an indication of a periodicity p of the PDSCH occasions and a time separation K1 between each PDSCH occasion and a corresponding PUCCH occasion.

According to examples of aspects described herein, a relay configuration including uplink transmission opportunities for a set of UEs 115 and corresponding HARQ feedback opportunities may be semi-persistently scheduled for the set of UEs 115. The uplink transmission opportunities may include, for example, PUSCH occasions. The HARQ feedback opportunities may include, for example, PDCCH occasions. In some examples, the base station 105 may transmit control signaling indicating scheduling parameters for the relay configuration, such as a periodicity p of the PUSCH occasions, temporal spacing K between each PUSCH occasion and a corresponding PDCCH occasion, or a maximum quantity of iterations for relaying a single uplink data packet. In some aspects, the periodicity p and the temporal spacing K may be indicated in the control signaling in terms of a number (quantity) of slots. In some cases, the base station 105 may transmit the control signaling or a portion thereof over a radio resource control RRC message, a MAC-CE, or both. Using the control signaling, for example, the base station 105 may configure the PUSCH occasions and the corresponding PDCCH occasions.

The base station 105 may activate the relay configuration for a given uplink data packet using a corresponding activation message addressed to the set of UEs 115 associated with the relay configuration. The activation message may indicate one or more parameters specific to using the relay configuration for the corresponding packet. In some cases, the activation message may include a DCI message. In an example, the activation message may include an indication of which UEs 115 are to participate as relay UEs 115 for the uplink data packet, along with the relay order associated with the participating relay UEs 115.

In some cases, the activation message may include an indication of a relay mode for one or more of the participating relay UEs 115. Example aspects of the relay mode are described with reference to FIG. 3. In some examples, the activation message may include a quantity of iterations for relaying the uplink data transmission (e.g., according to a relay loop). Each iteration (or relay loop) may include a transmission attempt by the source UE 115, and transmission attempts by each participating relay UE 115, before the relay configuration will be deactivated for the uplink data packet, among other examples.

In an example, the base station 105 may monitor the PUSCH occasions based on the activation of the relay configuration. The source UE 115 may transmit an uplink data packet to the base station 105 and one or more of the participating relay UEs 115. The base station 105 may transmit HARQ feedback (e.g., ACK, NACK) based on whether the base station 105 is able to successfully receive or decode the uplink data packet as transmitted by the source UE. For example, when the base station 105 successfully receives and decodes the uplink data packet as transmitted by the source UE 115, the base station 105 may transmit an ACK to the source UE 115 and the relay UEs 115, and the relay process may cease. In an example, the ACK may include that the relay configuration is deactivated for the uplink data packet In some cases, when the base station 105 does not successfully receive and decode the uplink data packet, the base station 105 may transmit a NACK to the source UE 115 and the relay UEs 115. A first relay UE 115, having previously received the uplink data packet from the source UE 115, may transmit the same packet to the base station. In some examples, the first relay UE 115 may be between the base station 105 and the source UE. In some aspects, when the base station 105 successfully receives and decodes the uplink data packet as transmitted by the first relay UE 115, the base station 105 may transmit an ACK to the source UE 115 and the relay UEs 115, and the relay process may cease.

In some other cases, additional relay UEs 115 having previously received the uplink data packet from the source UE 115, from a prior relay UE 115 (e.g., from the first relay UE), or both, may transmit the uplink data packet to the base station. For example, when the base station 105 does not successfully receive and decode the uplink data packet as transmitted by the first relay UE 115, the base station 105 may transmit a second NACK to the source UE 115 and the relay UEs 115, and a second relay UE 115 may transmit the uplink data packet to the base station. In some examples, UE 115-*c* may be between the base station 105 and the first relay UE. The relay process may continue across any number (quantity) of relay UEs 115 until the base station 105 transmits an ACK for the uplink data packet. In some cases, the relay process may continue across until a maximum number (quantity) of transmission attempts have been made. For example, the relay process may continue up to a maximum number of iterations (relay loops) for relaying the uplink data packet, where each iteration of the includes a respective attempt to transmit the uplink data packet by the source UE 115 and the relay UEs 115.

Figure 2:
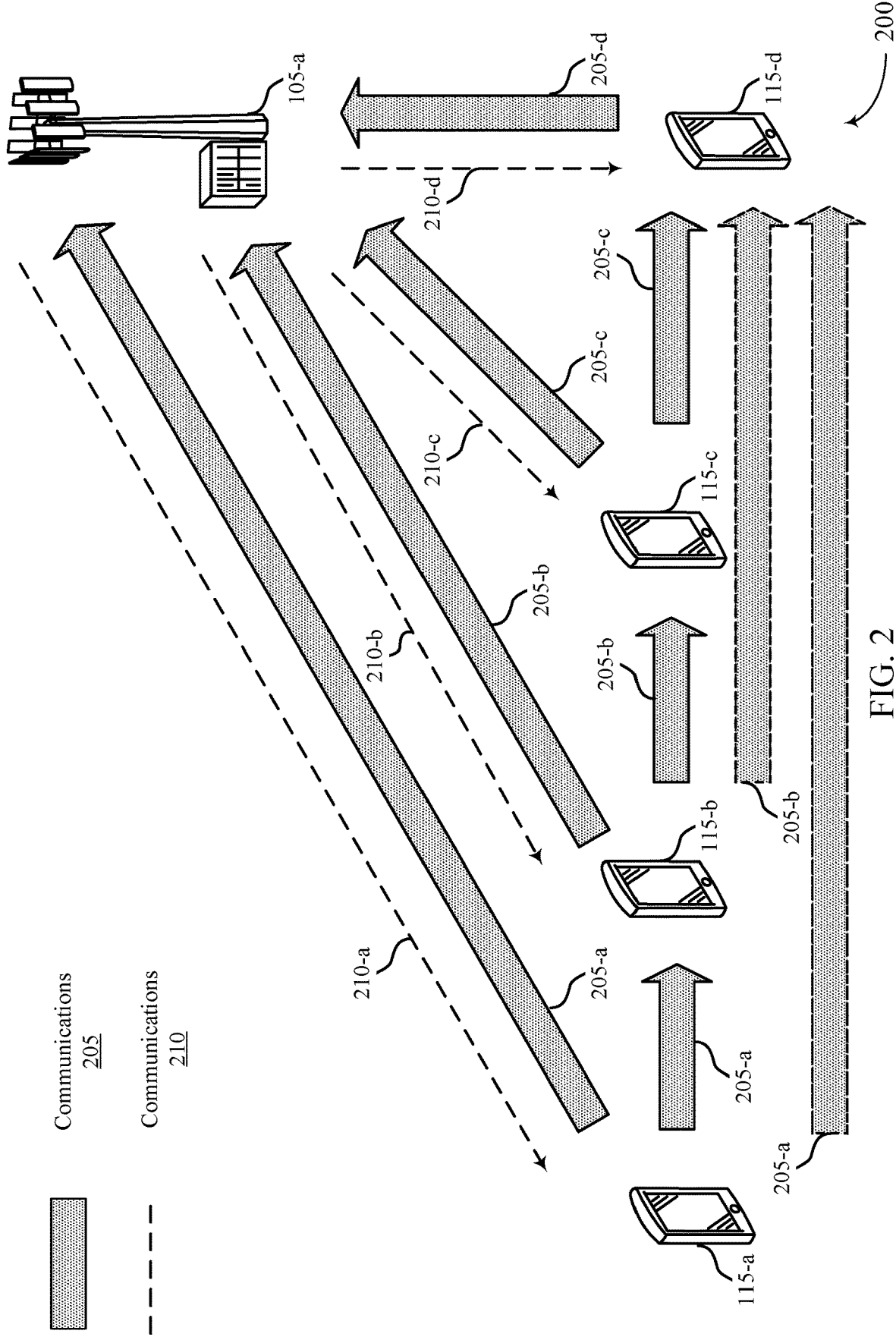
FIG. 2 illustrates an example of a wireless communications system that supports relaying and related configuration signaling for wireless communications in accordance with aspects of the present disclosure.

FIG. 2 illustrates an example of a wireless communications system 200 that supports relaying and related configuration signaling for wireless communications in accordance with aspects of the present disclosure. In some examples, wireless communications system 200 may implement aspects of wireless communication system 100 and may include UE 115-*a* through UE 115-*d* and a base station 105-*a*, which may be examples of a UE 115 and a base station 105, respectively, described with reference to FIG. 1. Examples of communications 205 and communications 210 between UE 115-*a* through UE 115-*d* and base station 105-*a* (based on an example relay configuration) are described herein. Each of UE 115 a through UE 115-*d* may be capable of transmitting communications 205 (e.g., uplink communications) to base station 105-*a* or receiving communications 210 (e.g., downlink communications) from base station 105-*a*. Any communication described herein as sent from base station 105-*a* to one or more of the UEs 115-*a* through 115-*d* (e.g., any RRC or MAC-CE signaling, any DCI message, any HARQ-ACK feedback message) may include a corresponding communication 210 to each of the UEs 115-*a* through 115-*d* (e.g., may include a corresponding communication 210-*a*, corresponding communication 210-*b*, corresponding communication 210-*c*, and corresponding communication 210-*d*). Similarly, any communication described herein as sent from one of UEs 115-*a* through 115-*d* to base station 105-*a* or one or more of the other UEs 115-*a* through 115-*d* (e.g., any transmission of a packet) may include a corresponding communication 205 to the base station 105-*a* and each of the other UEs 115-*a* through 115-*d* (e.g., may include a corresponding communication 205-*a*, corresponding communication 205-*b*, corresponding communication 205-*c*, and corresponding communication 205-*d*).

The base station 105-*a* may transmit, to UE 115-*a* through UE 115-*d*, control signaling (e.g., resource control RRC message, a MAC-CE) indicating a relay configuration. The indication of the relay configuration may include scheduling parameters for the relay configuration. In some aspects, the base station 105-*a* may transmit the control signaling (e.g., including the indication of the relay configuration) to a superset of UEs 115 that includes UE 115-*a* through UE 115-*d*. The relay configuration may include semi-persistent scheduling for communications 205, for example, for uplink transmission opportunities (e.g., PUSCH occasions) for UE 115-*a* through UE 115-*d*.

In some aspects, the relay configuration may include semi-persistent scheduling for communications 210, for example, for HARQ feedback opportunities (e.g., PDCCH occasions) corresponding to the uplink transmission opportunities (e.g., PUSCH occasions). In some examples, the control signaling may indicate scheduling parameters for the relay configuration, such as a periodicity p of the PUSCH occasions, temporal spacing K between each PUSCH occasion and a corresponding PDCCH occasion, or a maximum quantity of iterations for relaying a single uplink data packet. In some aspects, the periodicity p of the PUSCH occasions and the temporal spacing K between each PUSCH occasion may be indicated as a number of slots associated with available time-frequency resources.

The base station 105-*a* may activate the relay configuration for an uplink data packet to be transmitted from a source UE 115 (e.g., among UE 115-*a* through UE 115-*d*)—e.g., in response to a scheduling request transmitted by the source UE 115. For example, the base station 105-*a* may transmit an activation message (e.g., DCI message) indicating one or more parameters associated with using the relay configuration for the uplink data packet. In some cases, the base station 105-*a* may broadcast the activation message (e.g., broadcast a common DCI message, broadcast a groupcast transmission). For example, the base station 105-*a* may broadcast the activation message (e.g., DCI message) to UE 115-*a* through UE 115-*d*. Any message described herein as broadcast or groupcast may in some cases be transmitted on a broadcast channel, encoded with or otherwise addressed to an identifier (e.g., an RNTI) associated with a group of receiving devices (e.g., a group of UEs), or any combination thereof, or otherwise transmitted so as to be common to (e.g., commonly received by) each of a set of target devices. The activation message (e.g., DCI message) may include an indication of UEs 115 which are to participate as relay UEs 115 for the uplink data packet. In some aspects, the activation message (e.g., DCI message) may include an indication of the number (quantity) of hops associated with the relay UEs 115. The relay configuration may provide for uplink tunneling via the relay UEs 115, for example, in association with a wideband dedicated uplink tunnel having a relatively short time duration.

In some cases, UE 115-*a* through UE 115-*d* may each communicate with base station 105-*a* and a next UE 115 (according to the relay order) over a direct link (e.g., instead of using a broadcast transmission). For example, UE 115-*a* may communicate with each of base station 105-*a* and UE 115-*b* via a direct link (e.g., communication links 125 described with reference to FIG. 1), but may be unable to communicate with UE 115-*c* or UE 115-*d* via a direct link. In some cases, each of UE 115-*a* through UE 115-*d* may alternatively communicate with each other via direct links, regardless of hop number associated with relay UEs 115 (e.g., regardless of respective relay order associated with the relay UEs 115) among UE 115-*a* through UE 115-*d*.

In some examples, the base station 105-*a* may determine or select the participating relay UEs 115 based on criteria such as channel state information (CSI) associated therewith. The base station 105-*a* may determine the CSI, for example, from received CSI reports. In some aspects, the activation message (e.g., DCI message) may include identification information associated with the participating relay UEs 115. In some aspects, the activation message (e.g., DCI message) may include an indication of the relay order (e.g., order for relaying the uplink data packet, order of transmission relative to the start of the relay configuration) associated with the participating relay UEs 115.

In some examples, the activation message (e.g., DCI message) may include a quantity of iterations for relaying the uplink data transmission (e.g., according to a relay loop). Additionally, or alternatively, the control signaling (e.g., resource control RRC message, a MAC-CE) may include the quantity of iterations for relaying the uplink data transmission. Each iteration (or relay loop) may include a transmission attempt by the source UE 115 (e.g., UE 115-*a*), and transmission attempts by each participating relay UE 115 (e.g., UE 115-*b* through UE 115-*d*), before deactivation of the relay configuration for the uplink data packet, among other examples.

In the example of FIG. 2, UE 115-*a* may be a source UE 115, and UE 115-*b* through UE 115-*d* may be participating relay UEs 115. UE 115-*a* may transmit (e.g., broadcast) an uplink data packet (e.g., communications 205-*a*) to the base station 105-*a* and one or more of UE 115-*b* through UE 115-*d*. For example, UE 115-*a* may broadcast the uplink data packet (e.g., communications 205-*a*), such that the uplink data packet (e.g., communications 205-*a*) may be received or "heard" by any of UE 115-*b* through UE 115-*d* and base station 105-*a*. In some aspects, a relay UE 115 (e.g., UE 115-*b*), when also transmitting (e.g., relaying) the uplink data packet, may broadcast or groupcast the uplink data packet (e.g., communications 205-*b*), such that the uplink data packet (e.g., communications 205-*b*) may be received or "heard" by any of UE 115-*c*, UE 115-*d*, and base station 105-*a*, or in some cases also the source UE 115-*a*. In some cases, a relay UE 115 (e.g., any of UE 115-*b* through UE 115-*d*) receiving multiple transmissions of the uplink data packet may use soft combining techniques to increase reliability associated with decoding the uplink data packet over the course of the multiple transmissions. In some other cases, the base station 105-*a*, in receiving multiple transmissions of the uplink data packet may use soft combining techniques to increase reliably associated with decoding the uplink data packet over the course of the multiple transmissions.

The base station 105-*a* may transmit HARQ feedback (e.g., ACK, NACK) based on whether the base station 105-*a* is able to successfully receive or decode the uplink data packet as transmitted by UE 115-*a*. For example, when the base station 105-*a* successfully receives and decodes the uplink data packet as transmitted by UE 115-*a*, the base station 105-*a* may transmit an ACK to UE 115-*a* through UE 115-*d*, and the relay process may cease. In an example, the ACK may include that the relay configuration is deactivated for the uplink data packet. In some cases, HARQ feedback as described herein may be broadcast or groupcast by the base station 105-*a*.

In some cases, when the base station 105-*a* does not successfully receive and decode the uplink data packet as transmitted by UE 115-*a*, the base station 105-*a* may transmit a NACK to UE 115-*a* through UE 115-*d*. UE 115-*b*, having previously received the uplink data packet from UE 115-*a*, may transmit (relay) the same packet to the base station 105-*a*. For example, UE 115-*b* may broadcast the uplink data packet (e.g., via communications 205-*b*), such that the uplink data packet may be received (e.g., communications 205-*b* may be "heard") by any of UE 115-*c*, UE 115-*d*, and base station 105-*a*. In some aspects, when the base station 105-*a* successfully receives and decodes the uplink data packet as transmitted by UE 115-*b*, the base station 105-*a* may transmit an ACK to UE 115-*a* through UE 115-*d*, and the relay process may cease.

In some other cases, when the base station 105-*a* does not successfully receive and decode the uplink data packet as transmitted by UE 115-*b*, the base station 105-*a* may transmit a second NACK to UE 115-*a* through UE 115-*d*. UE 115-*c*, having previously received the uplink data packet from UE 115-*b*, may transmit (relay) the same packet to the base station 105-*a*. For example, UE 115-*c* may broadcast the uplink data packet (e.g., via communications 205-*c*), such that the uplink data packet may be received (e.g., communications 205-*c* may be "heard") by any of UE 115-*d* and base station 105-*a*. In some aspects, when the base station 105-*a* successfully receives and decodes the uplink data packet as transmitted by UE 115-*c*, the base station 105-*a* may transmit an ACK to UE 115-*a* through UE 115-*d*, and the relay process may cease.

The relay process may continue across any number (quantity) of relay UEs 115 (e.g., continue to UE 115-*d*) until the base station 105-*a* transmits an ACK for the uplink data packet. In some cases, the relay process may continue across until a maximum number (quantity) of transmission attempts associated with the relay process have been made. For example, the relay process may include a relay loop which may be repeated any number (quantity) of times. Each iteration of the relay loop may include a respective attempt to transmit the uplink data packet by each of UE 115-*a* through UE 115-*d*, where the attempts by UE 115-*b* through UE 115-*d* (e.g., the relay UEs 115) are based on a relay order associated with the relay configuration.

In some examples, the relay process may include a single iteration (e.g., number of relay loops equals one), and the relay process may continue up to UE 115-*d* (e.g., a last relay UE 115) of the relay order associated with the relay configuration. In some other examples, the relay process may include multiple iterations (e.g., number of loops equals two or more), and the relay process may continue up to a maximum number of iterations (relay loops) for relaying the uplink data packet. In some cases, when the base station 105-*a* does not successfully receive and decode the uplink data packet by the end of an iteration (e.g., where the number of relay loops is equal to one) or by the end of a set of iterations (e.g., where the number of relay loops is equal to two or more), the base station 105-*a* may transmit an additional activation message (e.g., additional DCI message) to one or more of UE 115-*a* through UE 115-*d*, in some aspects, to reactivate the relay loop.

In some cases, the additional activation message (e.g., additional DCI message) may include an indication for repeating the relay process, for a number of iterations (relay loops) based on the same relay configuration. In some examples, the additional activation message (e.g., additional DCI message) may include an indication for modifying parameters associated with the relay process. For example, the additional activation message (e.g., additional DCI message) may include an indication for modifying the relay order (e.g., order for relaying the uplink data packet, order of transmission relative to the start of the relay configuration) associated with the participating relay UEs 115 (e.g., UE 115-*b* through UE 115-*d*).

In some examples, the additional activation message (e.g., additional DCI message) may include an indication for removing one or more participating relay UEs 115 (e.g., removing one or more of UE 115-*b* through UE 115-*d*) from the relay process or adding relay UEs 115 to the relay process. In some aspects, the additional activation message (e.g., additional DCI message) may include an indication for removing the source UE 115 (e.g., UE 115-*a*) from the relay process. For example, the uplink data packet may already be maintained at one or more relay UEs 115 (e.g., one or more of UE 115-*b* through UE 115-*d*) which were able to successfully receive and decode the uplink data packet as transmitted by the source UE 115 (e.g., UE 115-*a*). In some aspects, the base station 105-*a* may determine whether a relay UE 115 successfully received and decoded the uplink data packet, for example, based on monitoring whether the relay UE (e.g., while in a decode-and-forward (DF) mode, aspects of which are described later herein) transmitted an uplink data packet during a respective PUSCH occasion associated with the relay UE 115.

In some aspects, a source UE 115 (e.g., UE 115-*a*) may have multiple uplink data packets to transmit to the base station 105-*a*. For example, UE 115-*a* may have multiple uplink data packets to transmit to the base station 105-*a*, and the base station 105-*a* may activate a respective relay configuration for transmitting (relaying) each of the uplink data packets. For example, the base station 105-*a* may transmit a respective activation message (e.g., DCI message) for each uplink data packet to be transmitted according to the relay configuration. In an example, the base station 105-*a* may transmit a first activation message (e.g., first DCI message) for a first uplink data packet to be transmitted according to the relay configuration (and according to a relay order), and the base station 105-*a* may transmit a second activation message (e.g., first DCI message) for a second (e.g., subsequent) uplink data packet to be transmitted according to the relay configuration (and according to the same relay order or a different relay order).

Figure 3:
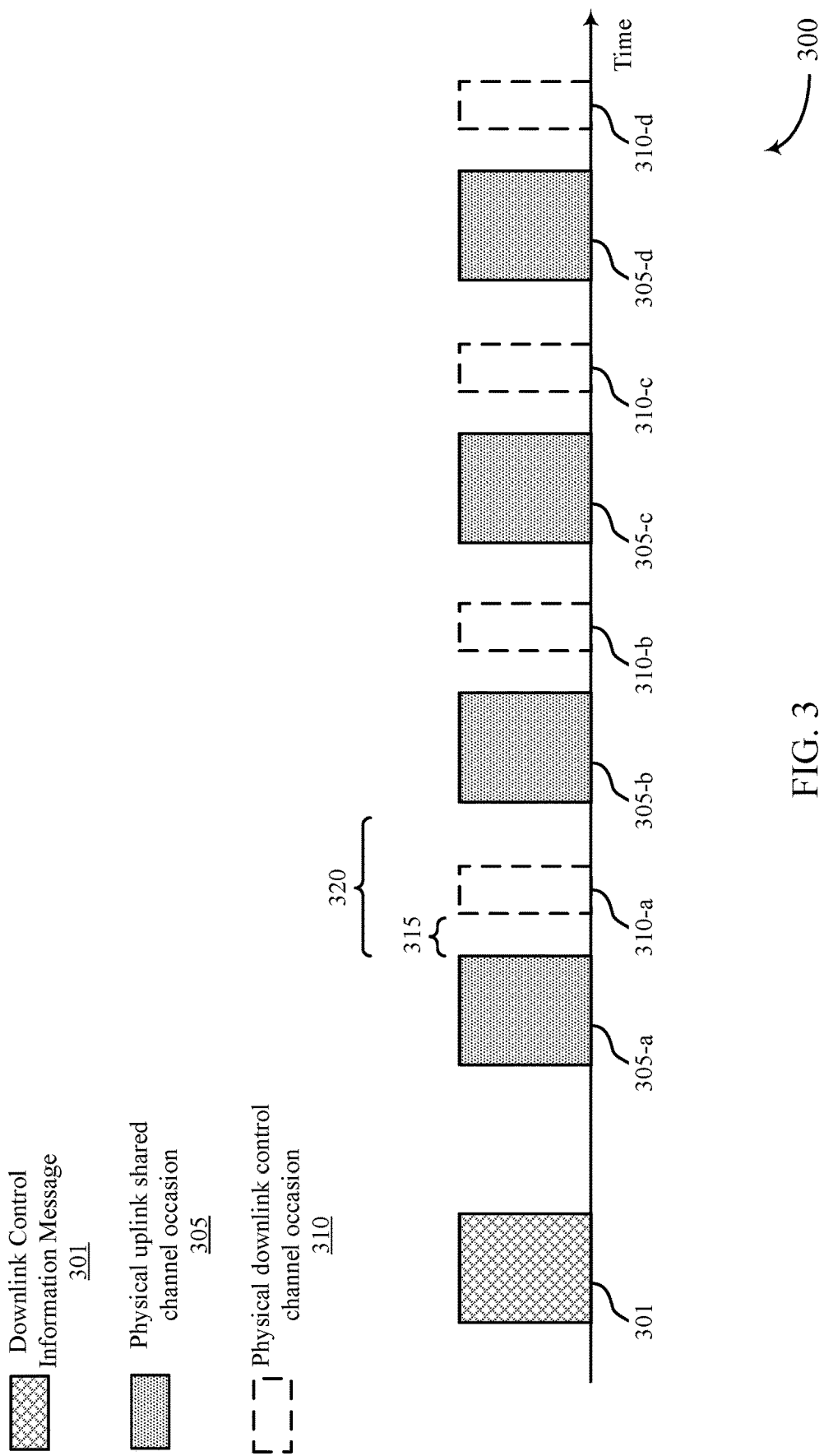
FIG. 3 illustrates an example of a relay configuration that supports relaying and related configuration signaling for wireless communications in accordance with aspects of the present disclosure.

FIG. 3 illustrates an example of a relay configuration 300 that supports relaying and related configuration signaling for wireless communications in accordance with aspects of the present disclosure. In some examples, relay configuration 300 may implement aspects of wireless communication system 100. may implement aspects of the relay configurations described with reference to wireless communication systems 100 or 200. Example aspects of the relay configuration 300 are described with reference to base station 105-*a* and UE 115-*a* through UE 115-*d* of FIG. 2.

The base station 105-*a* may transmit, to UE 115-*a* through UE 115-*d*, control signaling (e.g., resource control RRC message, a MAC-CE) indicating scheduling parameters for the relay configuration 300. The relay configuration 300 may include semi-persistent scheduling for uplink transmission opportunities (e.g., PUSCH occasions 305) and HARQ feedback opportunities (e.g., PDCCH occasions 310) corresponding to the uplink transmission opportunities. PUSCH occasion 305-*a* through PUSCH occasion 305-*d* include examples of aspects of the PUSCH occasions respectively associated with UE 115-*a* through UE 115-*d* described with reference to FIG. 2. PDCCH occasions 310-*a* through 310-*d* include examples of aspects of the PDCCH occasions respectively associated with UE 115-*a* through UE 115-*d* described with reference to FIG. 2. In an example, PUSCH occasion 305-*b* through PUSCH occasion 305-*d* may correspond to a relay order for relaying an uplink data packet transmitted (e.g., broadcast) at PUSCH occasion 305-*a*.

In some examples, the control signaling may indicate scheduling parameters for the relay configuration 300, such as a periodicity 320 (e.g., periodicity p) of the PUSCH occasions 305, temporal spacing 315 (e.g., temporal spacing K) between each PUSCH occasion 305 (e.g., a PUSCH occasion 305-*a*) and a corresponding PDCCH occasion 310 (e.g., a PDCCH occasion 310-*a*), or a maximum quantity of iterations for relaying a single uplink data packet. In some aspects, the periodicity 320 (e.g., periodicity p) of the PUSCH occasions 305 and the temporal spacing 315 (e.g., temporal spacing K) between each PUSCH occasion 305 (e.g., between PUSCH occasion 305-*a* and PUSCH occasion 305-*b*) may be indicated as a number (quantity) of slots associated with available time-frequency resources. In some cases, the base station 105-*a* may set the periodicity 320 (e.g., set the value of periodicity p) based on a priority or importance of the uplink data packet to be transmitted. In an example, the periodicity 320 may be relatively shorter for high priority data (e.g., URLLC) or relatively larger for low priority data.

The base station 105-*a* may activate the relay configuration 300 for an uplink data packet to be transmitted from a source UE 115 (e.g., UE 115-*a*). For example, the base station 105-*a* may transmit an activation message (e.g., DCI message 301) indicating one or more parameters associated with using the relay configuration 300 for the uplink data packet. In some aspects, the activation message (e.g., DCI message 301) may be in accordance with a DCI format dedicated to activation messages for relay configurations.

In some cases, the activation message (e.g., DCI message 301) may include a scheduling grant and resource allocation for one or more of PUSCH occasion 305-a through PUSCH occasion 305-d. In some cases, the activation message may include an indication of a relay mode for one or more of the relay UEs 115 (e.g., one or more UE 115-b through UE 115-d). For example, the activation message may indicate a relay mode (e.g., the same relay mode) for all the relay UEs 115 (e.g., all of UE 115-b through UE 115-d). In some aspects, the activation message may indicate a relay mode for each relay UE 115 (e.g., each of UE 115-b through UE 115-d) individually.

In some aspects, the activation message may indicate a decode-and-forward (DF) mode. In an example of the DF mode, a relay UE 115 may relay an uplink data packet during a respective PUSCH occasion 305 for the relay UE 115 based on a successful decode (e.g., CRC pass) of the uplink data packet by the relay UE 115 during a prior PUSCH occasion 305. For example, UE 115-b may relay an uplink data packet during a PUSCH occasion 305-b for the UE 115-b, based on a successful decode of the uplink data packet by the UE 115-b during PUSCH occasion 305-a (e.g., during which UE 115-a initially transmitted or broadcast the uplink data packet).

In another example of the DF mode, a relay UE 115 may skip relaying an uplink data packet during a respective PUSCH occasion 305 for the relay UE 115 based on an unsuccessful decoding attempt (e.g., CRC fail) of the uplink data packet by the relay UE 115 during a prior PUSCH occasion 305. For example, UE 115-b may skip relaying an uplink data packet during a PUSCH occasion 305-b for the UE 115-b, based on an unsuccessful successful decode of the uplink data packet by the UE 115-b during PUSCH occasion 305-a (e.g., during which UE 115-a initially transmitted or broadcast the uplink data packet). In some aspects, UE 115-b may skip relaying an uplink data packet during a PUSCH occasion 305-b for the UE 115-b for cases in which UE 115-b is unable to transmit during the PUSCH occasion 305-b (e.g., due to scheduling conflicts, low battery, etc.).

In some cases, by monitoring the PUSCH occasions 305 (e.g., PUSCH occasion 305-b corresponding to UE 115-b), the base station 105-a may be able to determine whether any PUSCH occasions 305 are empty (e.g., has low signal power). For example, the base station 105-a may determine PUSCH occasion 305-b is empty (e.g., has low signal power). The base station 105-a may, in some aspects, thereby determine or infer that UE 115-b was either unable to correctly decode the uplink data packet (that was transmitted during PUSCH occasion 305-a) or that UE 115-b was unable to transmit during PUSCH occasion 305-b. Based on the determination, the base station 105-a may transmit a NACK (e.g., during PDCCH occasion 310-b), for example, to UE 115-a through UE 115-d.

In some other aspects, the activation message may indicate an amplify-and-forward (AF) mode. In an example of the AF mode, a relay UE 115 may forward an uplink data packet without attempting to decode. In the AF mode, the relay UE 115 may store an uplink data packet received by the relay UE 115 (e.g., regardless of whether the relay UE 115 successfully decodes the uplink data packet), such that the relay UE 115 may relay or forward the uplink data packet during a respective PUSCH occasion 305 for the relay UE 115. For example, the relay UE 115 may relay signaling (e.g., an uplink data packet) received by the relay UE 115 during a prior PUSCH occasion 305, without attempting to decode the received signaling.

In an example of the AF mode, during PUSCH occasion 305-b, UE 115-b may relay signaling (e.g., an uplink data packet) received by UE 115-b during PUSCH occasion 305-a, without attempting to decode the received signaling. In some cases, UE 115-b may save power by refraining from attempting to decode the uplink data packet. In some aspects of the AF mode, UE 115-b may skip relaying the uplink data packet during a PUSCH occasion 305-b for the UE 115-b for cases in which the received signal power (or received signal strength indicator (RSSI) for the prior PUSCH occasion (e.g., PUSCH occasion 305-a) is below a signal power threshold.

In some aspects, the relay UEs may be configured for mixed relaying. For example, a relay UE 115 may be configured for a mixed relaying mode. In an example of the mixed relaying mode, the relay UE 115 may attempt to decode an uplink data packet received by the UE 115 during a previous PUSCH occasion 305. If the UE 115 is unable to successfully decode the uplink data packet (e.g., CRC fail), the UE 115 may still relay or forward the uplink data packet during a respective PUSCH occasion 305 for the relay UE 115. For example, the relay UE 115 may relay or forward the uplink data packet for cases in which the signal power or estimated signal-to-noise ratio associated with the previous transmission of the uplink data packet (e.g., during the previous PUSCH occasion 305) is above a threshold.

In some examples, the relay UE 115 may relay or forward an unsuccessfully decode uplink data packet for cases in which the signal power or estimated signal-to-noise ratio associated with the previous transmission of the uplink data packet (e.g., during the previous PUSCH occasion 305) is above a threshold. In another example, the relay UE 115 may relay or forward an unsuccessfully decode uplink data packet for cases in which metrics (e.g., log-likelihood ratio (LLR)) for the coded data associated with the previous transmission of the uplink data packet (e.g., during the previous PUSCH occasion 305) satisfy a threshold. In some cases, the relay UE 115 may relay or forward an unsuccessfully decode uplink data packet for cases in which a number of unchecked parity checks is below a threshold.

In some aspects, the base station 105-a may receive, from each relay UE 115 (e.g., from UE 115-b through UE 115-d), a respective indication of a capability of the relay UE 115 to operate in accordance with one or more relay modes (e.g., DF mode, AF mode, a mixed relay mode) or of the set of relay modes. The base station 105-a may select relay modes (e.g., DF mode, AF mode, mixed relay mode) for each relay UE 115 based on the respective capability of each relay UE 115.

Figure 4:
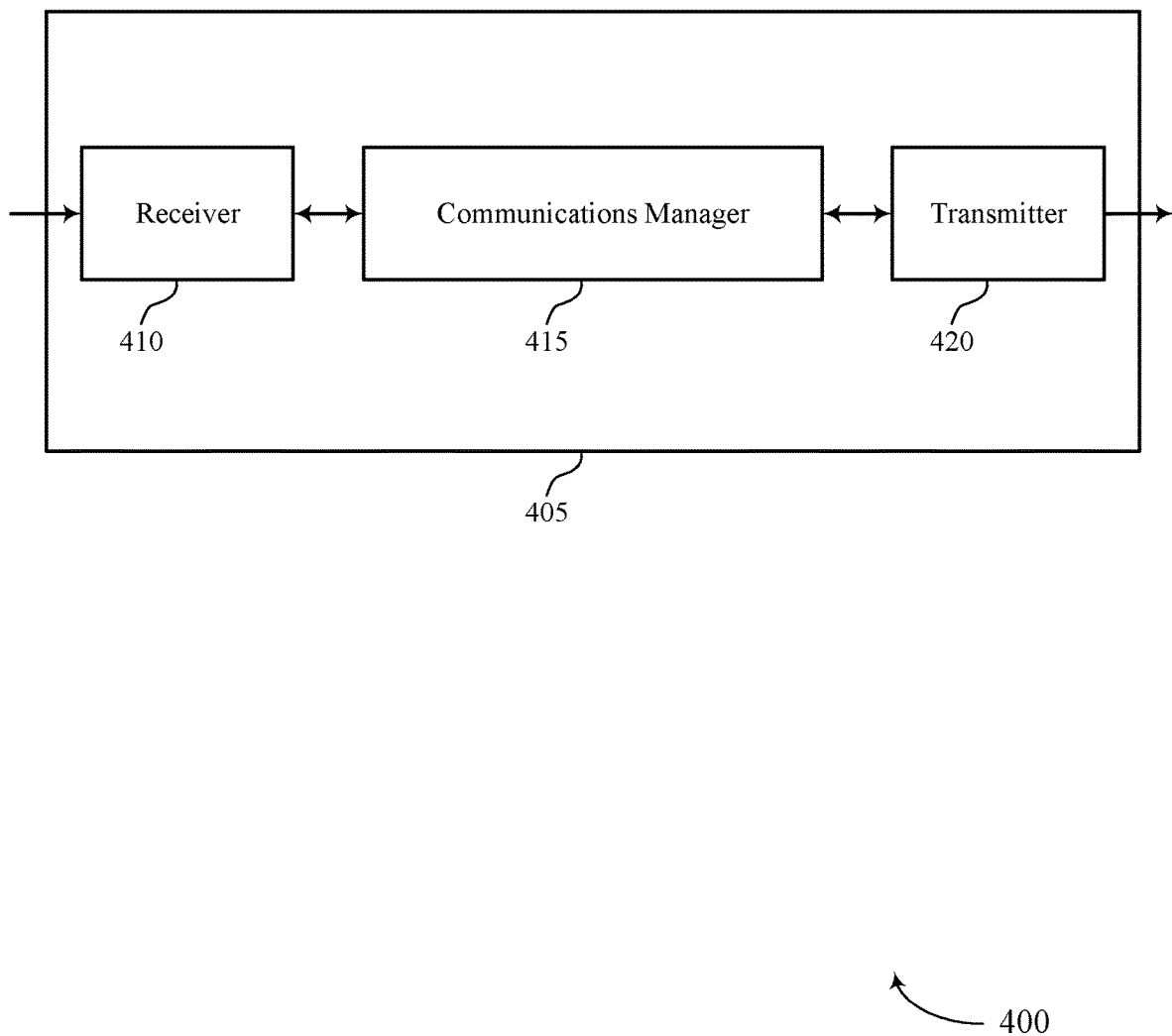
FIGS. 4 and 5 show block diagrams of devices that support relaying and related configuration signaling for wireless communications in accordance with aspects of the present disclosure.

FIG. 4 shows a block diagram 400 of a device 405 that supports relaying and related configuration signaling for wireless communications in accordance with aspects of the present disclosure. The device 405 may be an example of aspects of a UE 115 (e.g., a source UE, a relay UE) as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, or information related to relaying and related configuration signaling for wireless communications). Information may be passed on to other components of the device 405. The receiver 410 may be an example of aspects of the transceiver 720 described with reference to FIG. 7. The receiver 410 may utilize a single antenna or a set of antennas.

In an example in which the device 405 is a source UE, the communications manager 415 may receive, from a base station, an indication of a relay configuration for a set of UEs that includes the source UE and one or more relay UEs for relaying the uplink data packet, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs. The communications manager 415 may transmit, during a first physical uplink data channel occasion of the set of physical uplink data channel occasions, an uplink data packet to the base station and the one or more relay UEs based on the relay configuration. The communications manager 415 may receive, from the base station, a positive acknowledgement for the uplink data packet during a physical downlink control channel occasion of the set of physical downlink control channel occasions, where the positive acknowledgement indicates that the relay configuration is deactivated for the uplink data packet.

In an example in which the device 405 is a first relay UE, the communications manager 415 may also receive, from a base station, an indication of a relay configuration for a set of UEs that includes a source UE for an uplink data packet and one or more relay UEs for relaying the uplink data packet, the first relay UE included in the one or more relay UEs, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs. The communications manager 415 may receive, from the source UE or a second relay UE of the one or more relay UEs, first signaling associated with the uplink data packet during a first physical uplink data channel occasion of the set of physical uplink data channel occasions. The communications manager 415 may transmit, to the base station during a second physical uplink data channel occasion of the set of physical uplink data channel occasions, second signaling associated with the uplink data packet based on receiving the negative acknowledgement, where the second signaling is based on the first signaling. The communications manager 415 may receive, from the base station, a negative acknowledgment for the uplink data packet during a first physical downlink control channel occasion of the set of physical downlink control channel occasions, the first physical downlink control channel occasion corresponding to the first physical uplink data channel occasion. The communications manager 415 may be an example of aspects of the communications manager 710 described herein.

The communications manager 415, or its sub-components, may be implemented in hardware, software (e.g., executed by a processor), or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
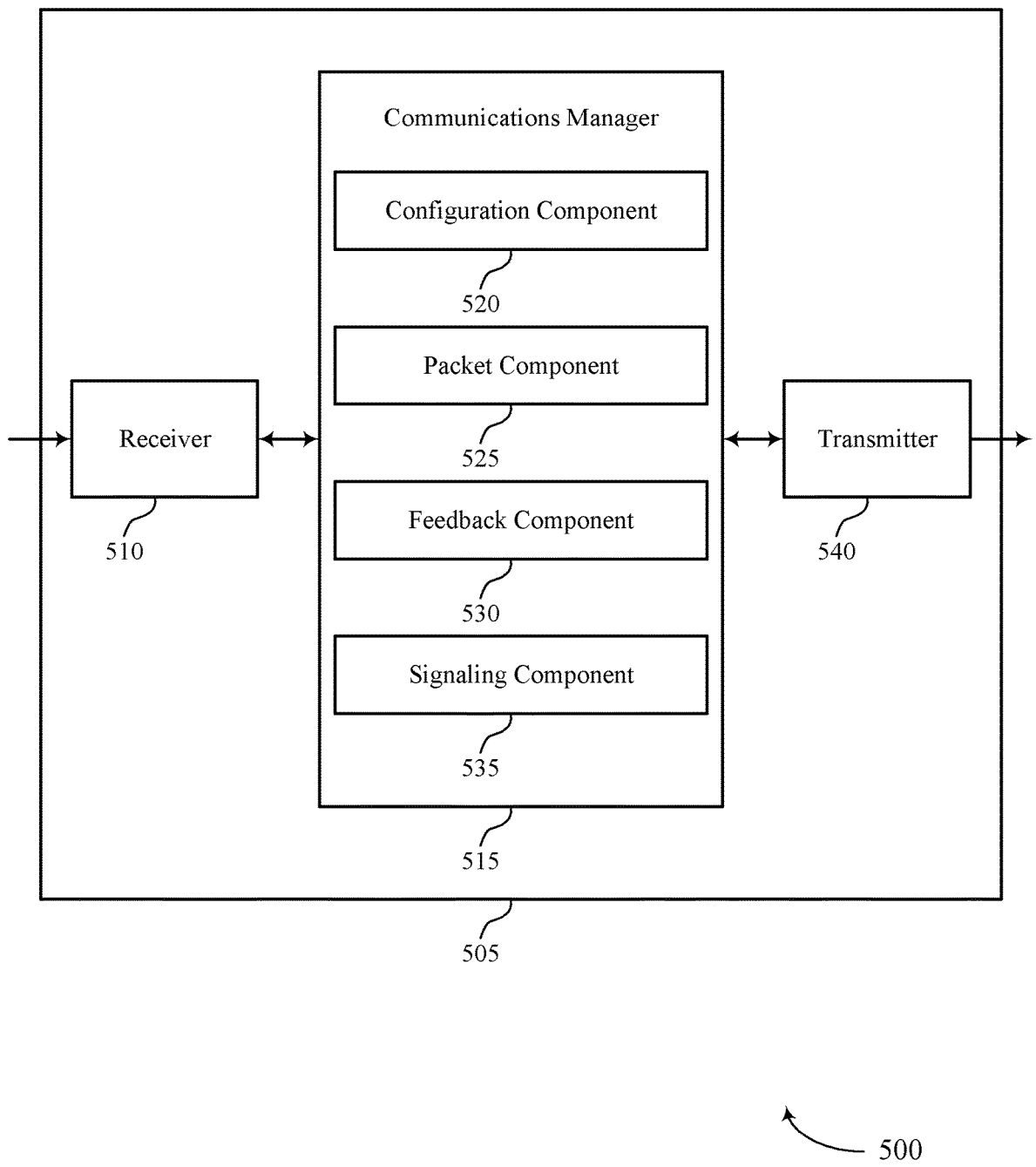

FIG. 5 shows a block diagram 500 of a device 505 that supports relaying and related configuration signaling for wireless communications in accordance with aspects of the present disclosure. The device 505 may be an example of aspects of a device 405, or a UE 115 (e.g., a source UE, a relay UE) as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to relaying and related configuration signaling for wireless communications). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration component 520, a packet component 525, a feedback component 530, and a signaling component 535. The communications manager 515 may be an example of aspects of the communications manager 710 described herein.

In an example in which the device 505 is a source relay UE, the configuration component 520 may receive, from a base station, an indication of a relay configuration for a set of UEs that includes the source UE and one or more relay UEs for relaying the uplink data packet, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs.

The packet component 525 may transmit, during a first physical uplink data channel occasion of the set of physical uplink data channel occasions, an uplink data packet to the base station and the one or more relay UEs based on the relay configuration.

The feedback component 530 may receive, from the base station, a positive acknowledgement for the uplink data packet during a physical downlink control channel occasion of the set of physical downlink control channel occasions, where the positive acknowledgement indicates that the relay configuration is deactivated for the uplink data packet.

In an example in which the device 505 is a first relay UE, the configuration component 520 may receive, from a base station, an indication of a relay configuration for a set of UEs that includes a source UE for an uplink data packet and one or more relay UEs for relaying the uplink data packet, the first relay UE included in the one or more relay UEs, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs.

The signaling component 535 may receive, from the source UE or a second relay UE of the one or more relay UEs, first signaling associated with the uplink data packet during a first physical uplink data channel occasion of the set of physical uplink data channel occasions and transmit, to the base station during a second physical uplink data channel occasion of the set of physical uplink data channel occasions, second signaling associated with the uplink data packet based on receiving the negative acknowledgement, where the second signaling is based on the first signaling.

The feedback component 530 may receive, from the base station, a negative acknowledgment for the uplink data packet during a first physical downlink control channel occasion of the set of physical downlink control channel occasions, the first physical downlink control channel occasion corresponding to the first physical uplink data channel occasion.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
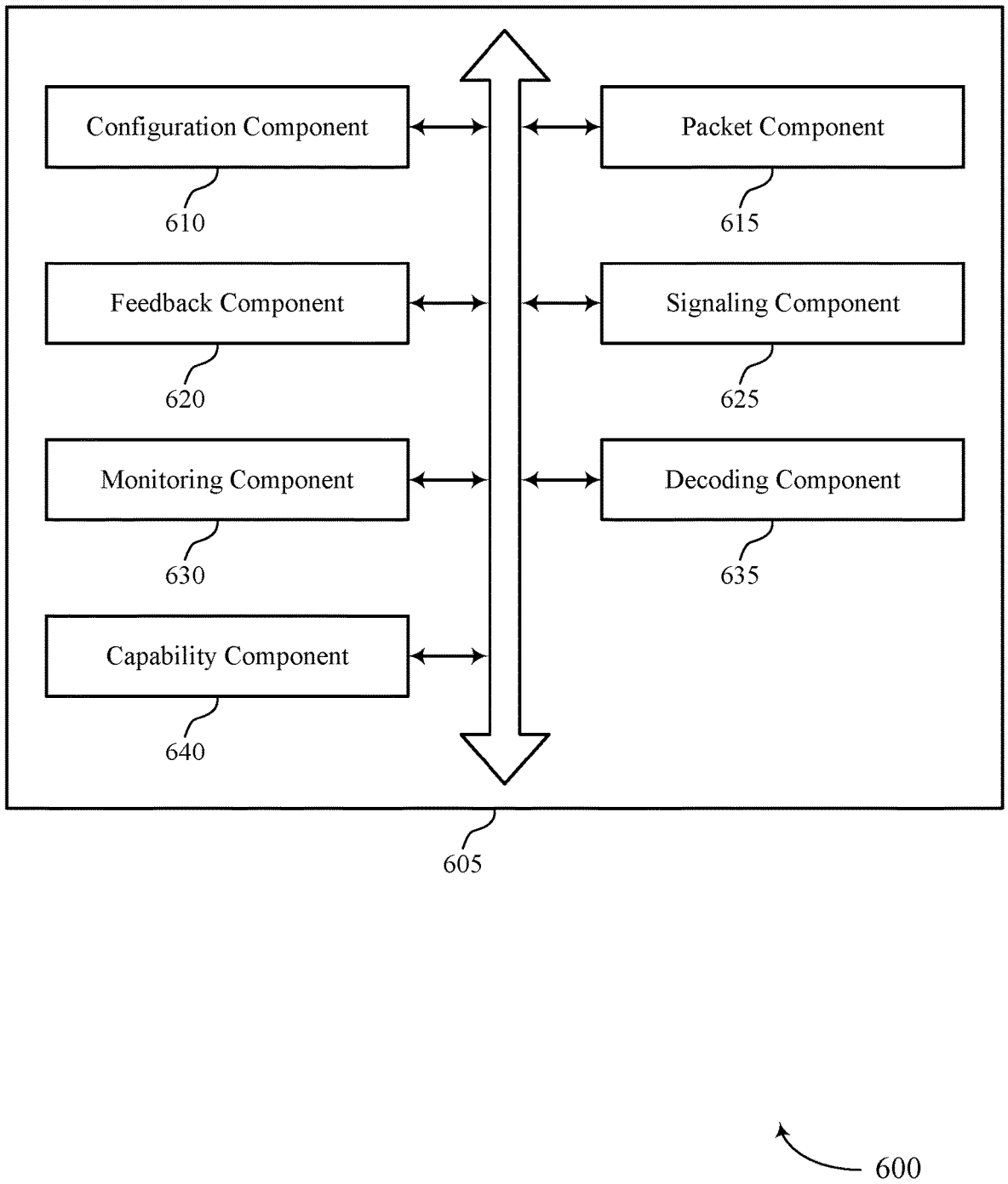
FIG. 6 shows a block diagram of a communications manager that supports relaying and related configuration signaling for wireless communications in accordance with aspects of the present disclosure.

FIG. 6 shows a block diagram 600 of a communications manager 605 that supports relaying and related configuration signaling for wireless communications in accordance with aspects of the present disclosure. The communications manager 605 may be an example of aspects of a communications manager 415, a communications manager 515, or a communications manager 710 described herein. The communications manager 605 may include a configuration component 610, a packet component 615, a feedback component 620, a signaling component 625, a monitoring component 630, a decoding component 635, and a capability component 640. Each of these modules may communicate, directly or indirectly, with one another (e.g., via one or more buses).

In an example in which the communications manager 605 is included in a source UE, the configuration component 610 may receive, from a base station, an indication of a relay configuration for a set of UEs that includes the source UE and one or more relay UEs for relaying the uplink data packet, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs.

In an example in which the communications manager 605 is included in a first relay UE, the configuration component 610 may receive, from a base station, an indication of a relay configuration for a set of UEs that includes a source UE for an uplink data packet and one or more relay UEs for relaying the uplink data packet, the first relay UE included in the one or more relay UEs, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs.

In some examples, the configuration component 610 may receive semi-persistent scheduling information for the set of physical uplink data channel occasions, the set of physical downlink control channel occasions, or both. In some examples, receiving the scheduling information may include receiving an indication of a periodicity associated with the set of physical uplink data channel occasions, an indication of a temporal spacing between each physical uplink data channel occasion of the set of physical uplink data channel occasions and a corresponding physical downlink control channel occasion of the set of physical downlink control channel occasions, or both. In some examples, receiving the scheduling information may include receiving a radio resource control message or a media access control-control element that includes at least a portion of the scheduling information.

In some examples, the configuration component 610 may receive from the base station, after receiving the indication of the relay configuration, an activation message for the relay configuration and the uplink data packet, where transmitting the uplink data packet is based on receiving the activation message. In some examples, the configuration component 610 may receive a second activation message for the relay configuration and a second uplink data packet. In some examples, the configuration component 610 may receive, after receiving the negative acknowledgement for the corresponding physical uplink data channel occasion for each of the one or more relay UEs, a second activation message for the relay configuration and the uplink data packet. In some examples, the configuration component 610 may receive semi-persistent scheduling information for the set of physical uplink data channel occasions, the set of physical downlink control channel occasions, or both.

In some examples, the configuration component 610 may receive an indication of a periodicity associated with the set of physical uplink data channel occasions, an indication of a temporal spacing between each physical uplink data channel occasion of the set of physical uplink data channel occasions and a corresponding physical downlink control channel occasion of the set of physical downlink control channel occasions, or both. In some examples, the configuration component 610 may receive from the base station, after receiving the indication of the relay configuration, an activation message for the relay configuration and the uplink data packet.

In some cases, the activation message includes a downlink control information message configured to activate the relay configuration for the set of UEs. In some cases, the activation message is in accordance with a downlink control information format dedicated to activation messages for relay configurations. In some cases, the activation message includes an indication of a quantity of iterations for relaying the uplink data packet, each iteration of the quantity of iterations including a respective attempt to transmit the uplink data packet by each UE of the set of UEs. In some cases, the activation message includes a scheduling grant for the source UE to transmit the uplink data packet during the first physical uplink data channel occasion.

In some cases, the scheduling information includes an indication of a quantity of iterations for relaying the uplink data packet by the one or more relay UEs, each iteration of the quantity of iterations including a respective attempt to transmit the uplink data packet by each UE of the set of UEs. In some cases, the activation message includes a downlink control information message configured to activate the relay configuration for the set of UEs. In some cases, the activation message is in accordance with a downlink control information format dedicated to activation messages for relay configurations. In some cases, the activation message includes an indication of the set of UEs, the one or more relay UEs for relaying the uplink data packet, or both.

In some cases, the activation message includes an indication of a relay order for relaying the uplink data packet by the one or more relay UEs, where the relay order corresponds to an order of transmission for the one or more relay UEs, and where transmitting the second signaling during the second physical uplink data channel occasion is based on the relay order. In some cases, the activation message includes an indication of a quantity of iterations for relaying the uplink data packet, each iteration of the quantity of iterations including a respective attempt to transmit the uplink data packet by each UE of the set of UEs. In some cases, the activation message includes a scheduling grant for the first relay UE to transmit the second signaling during the second physical uplink data channel occasion. In some cases, the activation message includes an indication that the first relay UE is to relay the uplink data packet in accordance with a first relay mode. In some cases, the activation message includes an indication that the first relay UE is to relay the uplink data packet in accordance with a second relay mode.

The packet component 615 may transmit, during a first physical uplink data channel occasion of the set of physical uplink data channel occasions, an uplink data packet to the base station and the one or more relay UEs based on the relay configuration. The feedback component 620 may receive, from the base station, a positive acknowledgement for the uplink data packet during a physical downlink control channel occasion of the set of physical downlink control channel occasions, where the positive acknowledgement indicates that the relay configuration is deactivated for the uplink data packet. In some examples, the feedback component 620 may receive, from the base station, a negative acknowledgment for the uplink data packet during a first physical downlink control channel occasion of the set of physical downlink control channel occasions, the first physical downlink control channel occasion corresponding to the first physical uplink data channel occasion. In some examples, the feedback component 620 may receive, for each of the one or more relay UEs, a negative acknowledgement for a corresponding physical downlink control channel occasion of the set of physical uplink data channel occasions.

In some examples, the feedback component 620 may receive, from the base station, a negative acknowledgement for the uplink data packet during a first physical downlink control channel occasion of the set of physical downlink control channel occasions, where the first physical downlink control channel occasion corresponds to the first physical uplink data channel occasion, and where the negative acknowledgement indicates that the relay configuration remains activated for the uplink data packet. In some examples, the feedback component 620 may receive, from the base station, a second negative acknowledgement for the uplink data packet during a second physical downlink control channel occasion of the set of physical downlink control channel occasions, the second physical downlink control channel occasion corresponding to the second physical uplink data channel occasion, where the second negative acknowledgement indicates that the relay configuration remains activated for the uplink data packet. In some examples, the feedback component 620 may receive, from the base station, a positive acknowledgement for the uplink data packet during a second physical downlink control channel occasion of the set of physical downlink control channel occasions, the second physical downlink control channel occasion corresponding to the second physical uplink data channel occasion, where the positive acknowledgement indicates that the relay configuration is deactivated for the uplink data packet.

The signaling component 625 may receive, from the source UE or a second relay UE of the one or more relay UEs, first signaling associated with the uplink data packet during a first physical uplink data channel occasion of the set of physical uplink data channel occasions. In some examples, the signaling component 625 may transmit, to the base station during a second physical uplink data channel occasion of the set of physical uplink data channel occasions, second signaling associated with the uplink data packet based on receiving the negative acknowledgement, where the second signaling is based on the first signaling. In some examples, the signaling component 625 may determine that a received signal power for the first signaling received during the first physical uplink data channel occasion satisfies a threshold, where transmitting the second signaling during the second physical uplink data channel occasion in accordance with the second relay mode is based on the received signal power for the first signaling satisfying the threshold.

In some examples, the signaling component 625 may receive, from the second relay UE or a third relay UE of the one or more relay UEs, third signaling associated with the uplink data packet during a third physical uplink data channel occasion of the set of physical uplink data channel occasions, the third physical uplink data channel occasion between the first physical uplink data channel occasion and the second physical uplink data channel occasion. In some examples, the signaling component 625 may perform soft combining based on the first signaling and the third signaling. In some examples, the signaling component 625 may generate the second signaling is based on the soft combining.

The monitoring component 630 may monitor one or more physical uplink data channel occasions of the set of physical uplink data channel occasions based on receiving the activation message, the one or more physical uplink data channel occasions including at least the first physical uplink data channel occasion. The decoding component 635 may attempt to decode the signaling received during the first physical uplink data channel occasion based on the indication to relay the uplink data packet in accordance with the first relay mode, where transmitting the second signaling during the second physical uplink data channel occasion in accordance with the first relay mode is based on successfully decoding the signaling received during the first physical uplink data channel occasion to obtain the uplink data packet.

In some examples, the decoding component 635 may refrain from attempting to decode the signaling received during the first physical uplink data channel occasion before transmitting the second signaling during the second physical uplink data channel occasion based on the indication to relay the uplink data packet in accordance with the second relay mode. The capability component 640 may transmit, to the base station, an indication of a capability of the first UE to relay the uplink data packet in accordance with a first relay mode, a second relay mode, or both.

Figure 7:
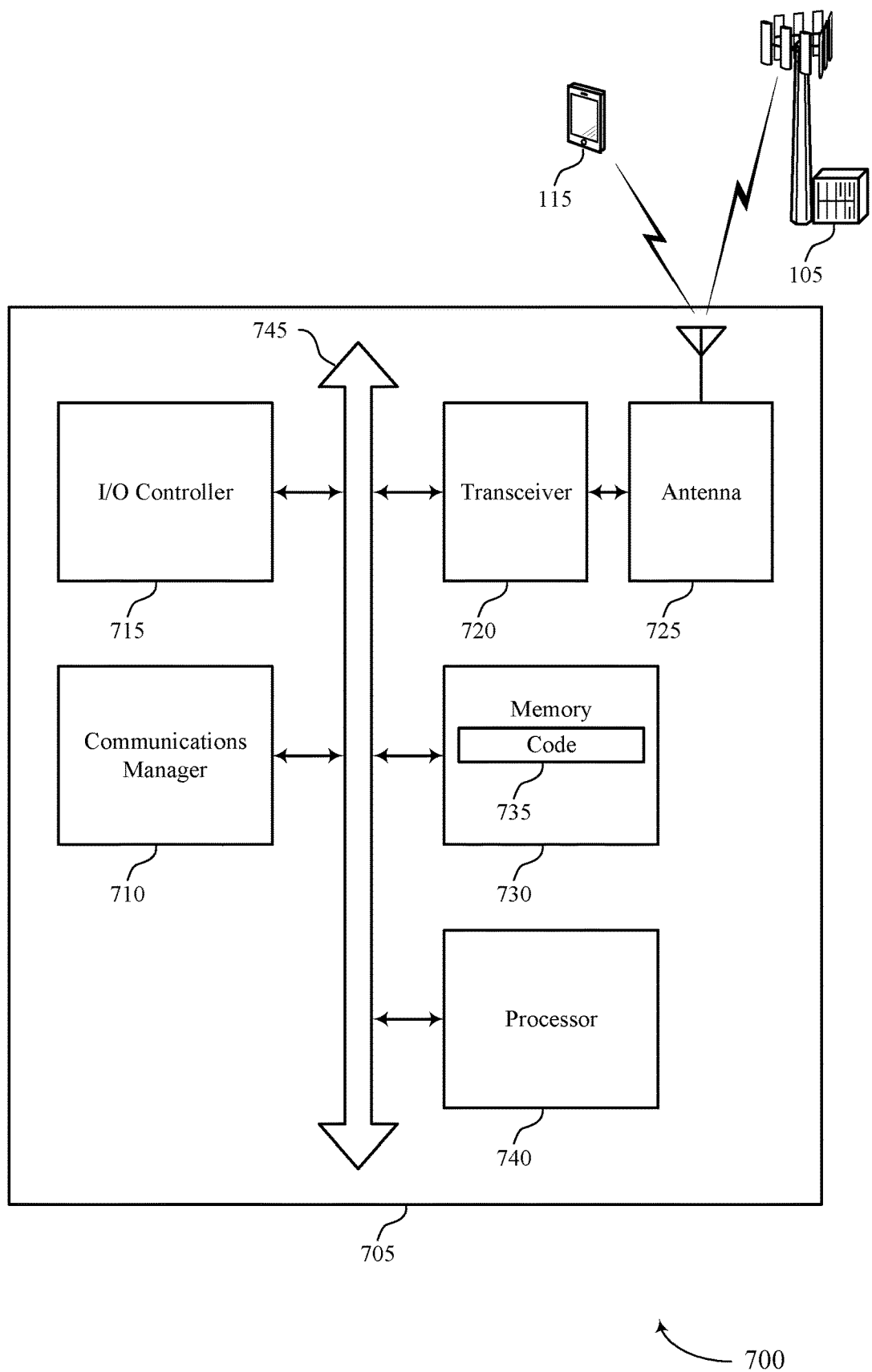
FIG. 7 shows a diagram of a system including a device that supports relaying and related configuration signaling for wireless communications in accordance with aspects of the present disclosure.

FIG. 7 shows a diagram of a system 700 including a device 705 that supports relaying and related configuration signaling for wireless communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

In an example in which the device 705 is a source UE, the communications manager 710 may receive, from a base station, an indication of a relay configuration for a set of UEs that includes the source UE and one or more relay UEs for relaying the uplink data packet, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs. The communications manager 710 may transmit, during a first physical uplink data channel occasion of the set of physical uplink data channel occasions, an uplink data packet to the base station and the one or more relay UEs based on the relay configuration. The communications manager 710 may receive, from the base station, a positive acknowledgement for the uplink data packet during a physical downlink control channel occasion of the set of physical downlink control channel occasions, where the positive acknowledgement indicates that the relay configuration is deactivated for the uplink data packet.

In an example in which the device 705 is a first relay UE, the communications manager 710 may also receive, from a base station, an indication of a relay configuration for a set of UEs that includes a source UE for an uplink data packet and one or more relay UEs for relaying the uplink data packet, the first relay UE included in the one or more relay UEs, where the relay configuration is associated with a set of physical uplink data channel occasions and a corresponding set of physical downlink control channel occasions, and where each physical uplink data channel occasion of the set of physical uplink data channel occasions is assigned to a respective UE of the set of UEs. The communications manager 710 may receive, from the source UE or a second relay UE of the one or more relay UEs, first signaling associated with the uplink data packet during a first physical uplink data channel occasion of the set of physical uplink data channel occasions. The communications manager 710 may transmit, to the base station during a second physical uplink data channel occasion of the set of physical uplink data channel occasions, second signaling associated with the uplink data packet based on receiving the negative acknowledgement, where the second signaling is based on the first signaling. The communications manager 710 may receive, from the base station, a negative acknowledgment for the uplink data packet during a first physical downlink control channel occasion of the set of physical downlink control channel occasions, the first physical downlink control channel occasion corresponding to the first physical uplink data channel occasion.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting relaying and related configuration signaling for wireless communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
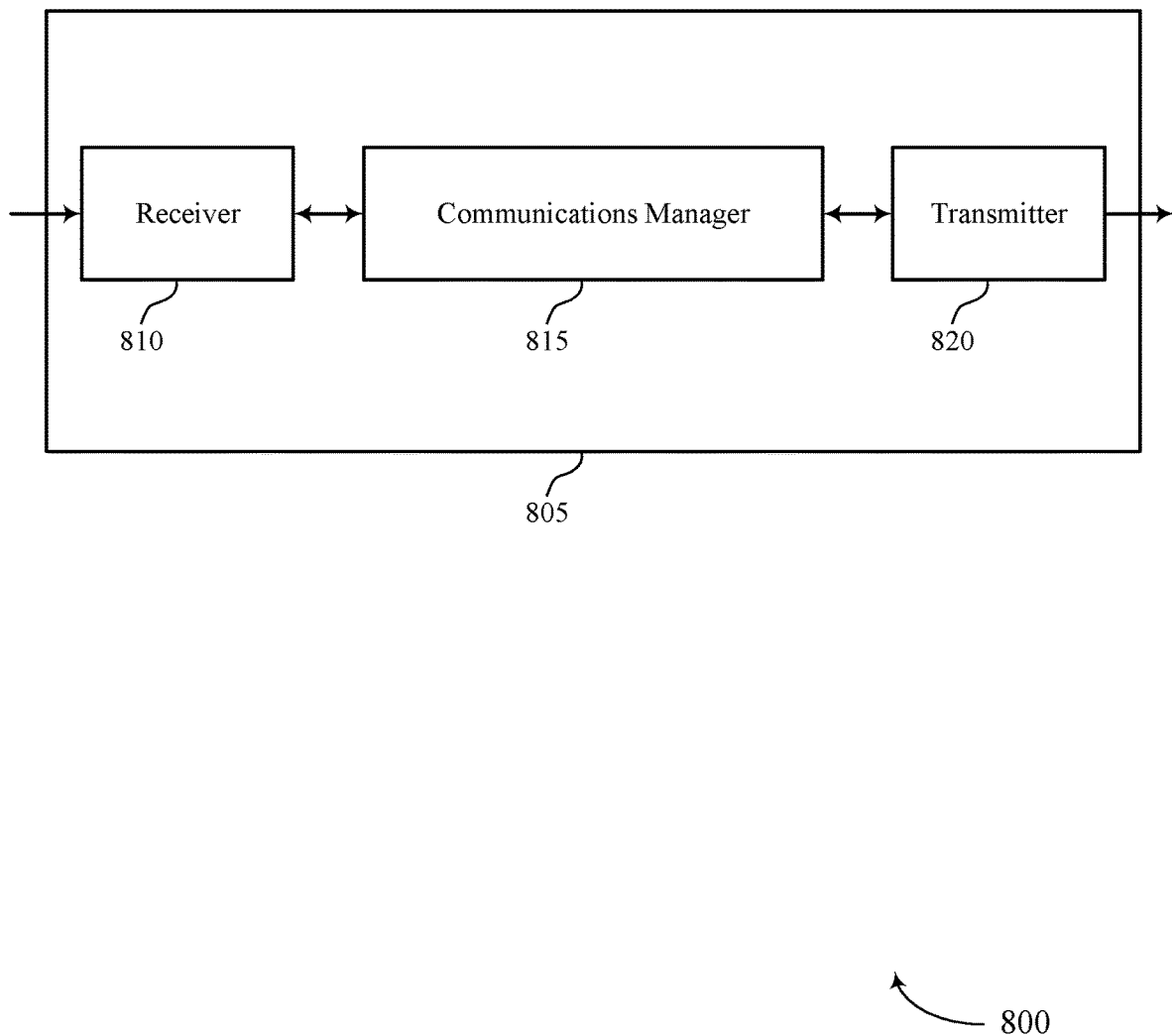
FIGS. 8 and 9 show block diagrams of devices that support relaying and related configuration signaling for wireless communications in accordance with aspects of the present disclosure.

FIG. 8 shows a block diagram 800 of a device 805 that supports relaying and related configuration signaling for wireless communications in accordance with aspects of the present disclosure. The device 805 may be an example of aspects of a wireless device (e.g., base station 105) as described herein. The device 805 may include a receiver 810, a communications manager 815, and a transmitter 820.

The device 805 may also include a processor. Each of these components may be in communication with one another (e.g., via one or more buses).

The receiver 810 may receive information such as packets, user data, or control information associated with various information channels (e.g., control channels, data channels, or information related to relaying and related configuration signaling for wireless communications). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a set of UEs, an indication of a relay configuration for the set of UEs, the relay configuration associated with a set of physical uplink data channel occasions and a corresponding set of physical downlink control channel occasions, where each physical uplink data channel occasion of the set of physical uplink data channel occasions is assigned to a respective UE of the set of UEs, and where the set of UEs includes a source UE for an uplink data packet and one or more relay UEs for relaying the uplink data packet. The communications manager 815 may monitor one or more physical uplink data channel occasions of the set of physical uplink data channel occasions after transmitting the indication of the relay configuration, receive, based on the monitoring, the uplink data packet from a UE of the set of UEs during a physical uplink data channel occasion of the set of physical uplink data channel occasions. The communications manager 815 may transmit, based on receiving the uplink data packet, a positive acknowledgement for the uplink data packet to the set of UEs during a physical downlink control channel occasion of the set of physical downlink control channel occasions, the physical downlink control channel occasion corresponding to the physical uplink data channel occasion, where the positive acknowledgement indicates that the relay configuration is deactivated for the uplink data packet. The communications manager 815 may be an example of aspects of the communications manager 1110 described herein.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
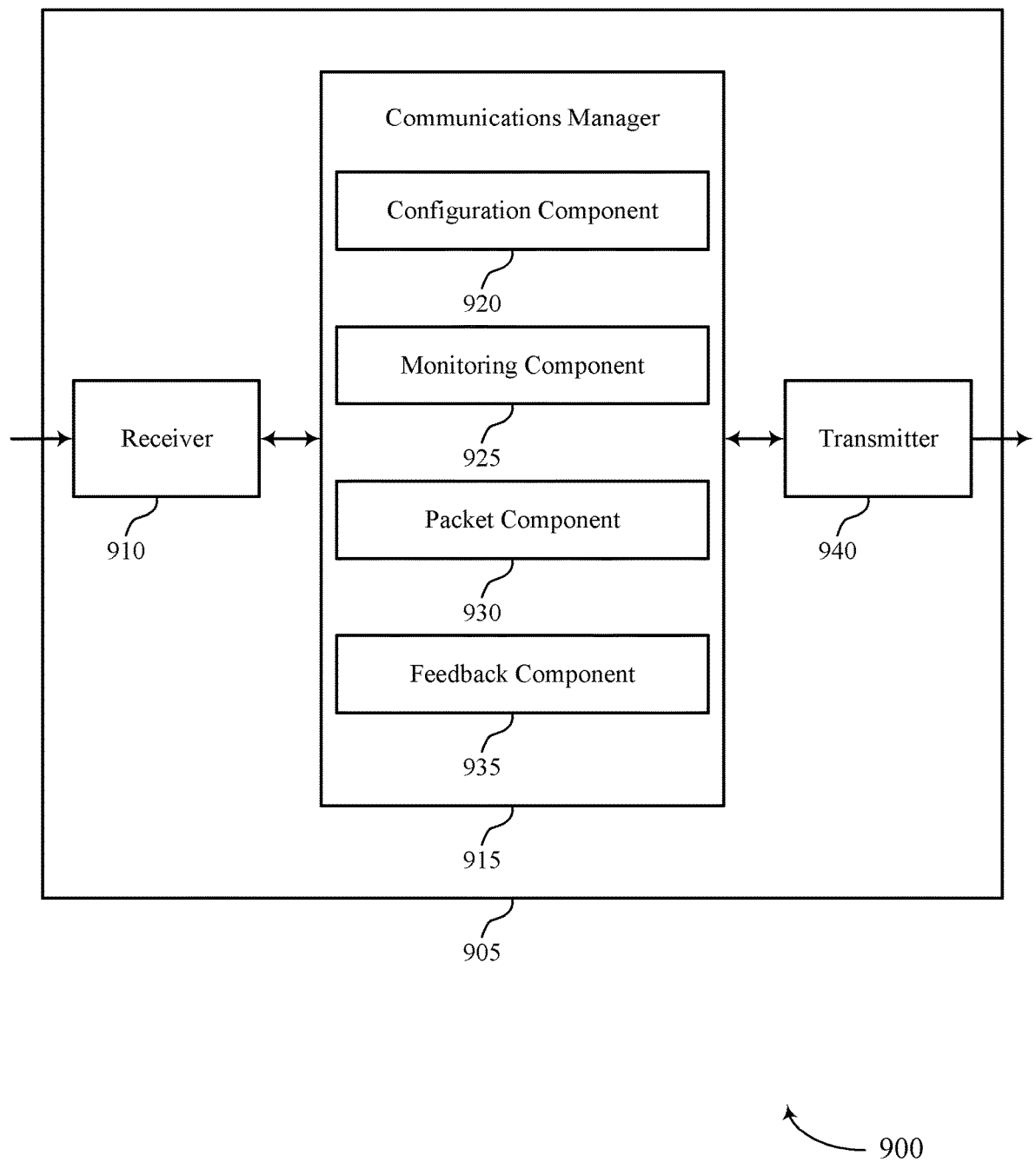

FIG. 9 shows a block diagram 900 of a device 905 that supports relaying and related configuration signaling for wireless communications in accordance with aspects of the present disclosure. The device 905 may be an example of aspects of a device 805, or a wireless device (e.g., base station 105) as described herein, or both. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, or information related to relaying and related configuration signaling for wireless communications). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration component 920, a monitoring component 925, a packet component 930, and a feedback component 935. The communications manager 915 may be an example of aspects of the communications manager 1110 described herein.

The configuration component 920 may transmit, to a set of UEs, an indication of a relay configuration for the set of UEs, the relay configuration associated with a set of physical uplink data channel occasions and a corresponding set of physical downlink control channel occasions, where each physical uplink data channel occasion of the set of physical uplink data channel occasions is assigned to a respective UE of the set of UEs, and where the set of UEs includes a source UE for an uplink data packet and one or more relay UEs for relaying the uplink data packet.

The monitoring component 925 may monitor one or more physical uplink data channel occasions of the set of physical uplink data channel occasions after transmitting the indication of the relay configuration.

The packet component 930 may receive, based on the monitoring, the uplink data packet from a UE of the set of UEs during a physical uplink data channel occasion of the set of physical uplink data channel occasions.

The feedback component 935 may transmit, based on receiving the uplink data packet, a positive acknowledgement for the uplink data packet to the set of UEs during a physical downlink control channel occasion of the set of physical downlink control channel occasions, the physical downlink control channel occasion corresponding to the physical uplink data channel occasion, where the positive acknowledgement indicates that the relay configuration is deactivated for the uplink data packet.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
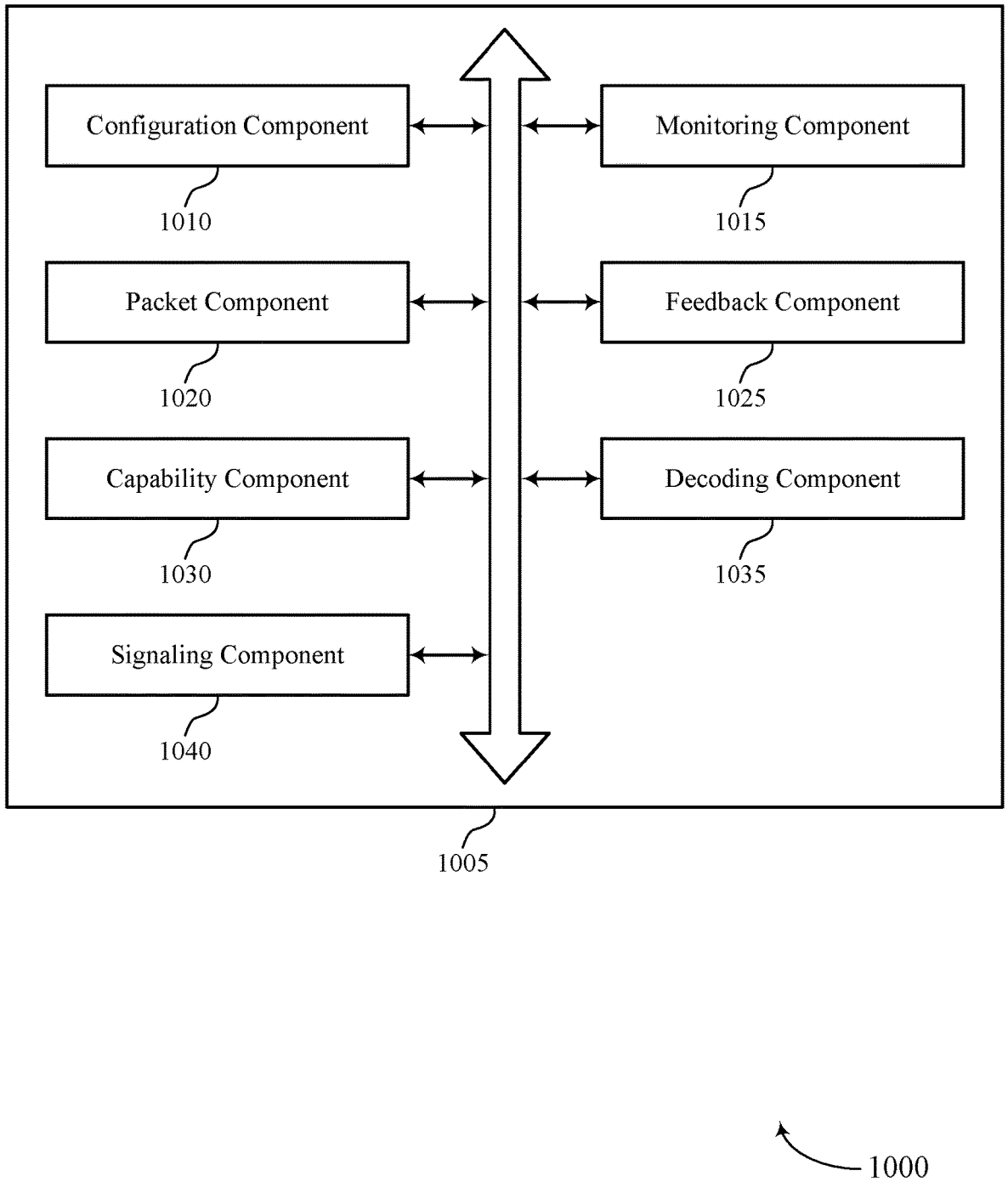
FIG. 10 shows a block diagram of a communications manager that supports relaying and related configuration signaling for wireless communications in accordance with aspects of the present disclosure.

FIG. 10 shows a block diagram 1000 of a communications manager 1005 that supports relaying and related configuration signaling for wireless communications in accordance with aspects of the present disclosure. The communications manager 1005 may be an example of aspects of a communications manager 815, a communications manager 915, or a communications manager 1110 described herein. The communications manager 1005 may include a configuration component 1010, a monitoring component 1015, a packet component 1020, a feedback component 1025, a capability component 1030, a decoding component 1035, and a signaling component 1040. Each of these modules may communicate, directly or indirectly, with one another (e.g., via one or more buses).

The configuration component 1010 may transmit, to a set of UEs, an indication of a relay configuration for the set of UEs, the relay configuration associated with a set of physical uplink data channel occasions and a corresponding set of physical downlink control channel occasions, where each physical uplink data channel occasion of the set of physical uplink data channel occasions is assigned to a respective UE of the set of UEs, and where the set of UEs includes a source UE for an uplink data packet and one or more relay UEs for relaying the uplink data packet.

In some examples, the configuration component 1010 may transmit semi-persistent scheduling information for the set of physical uplink data channel occasions, the set of physical downlink control channel occasions, or both. In some examples, the configuration component 1010 may transmit an indication of a periodicity associated with the set of physical uplink data channel occasions, an indication of a temporal spacing between each physical uplink data channel occasion of the set of physical uplink data channel occasions and a corresponding physical downlink control channel occasion of the set of physical downlink control channel occasions, or both. In some examples, the configuration component 1010 may transmit a radio resource control message or a media access control-control element that includes at least a portion of the scheduling information. In some examples, the configuration component 1010 may transmit to the set of UEs, after transmitting the indication of the relay configuration, an activation message for the relay configuration and the uplink data packet. In some examples, transmitting the activation message may include broadcasting or group casting the activation message to the set of UEs In some examples of transmitting the indication of the relay configuration to the set of UEs, the configuration component 1010 may transmit the indication of the relay configuration to a superset of UEs that includes the set of UEs and one or more additional UEs. In some examples, the configuration component 1010 may select, from a set of relay modes, a relay mode for the one or more relay UEs, where the activation message includes an indication of the relay mode for the one or more relay UEs. In some examples, the configuration component 1010 may select, from a set of relay modes, a respective relay mode for each relay UE of the one or more relay UEs, where the activation message includes an indication of the respective relay mode for each relay UE.

In some examples, the configuration component 1010 may transmit, based on receiving the uplink data packet, a second activation message for the relay configuration and a second uplink data packet.

In some examples, the configuration component 1010 may transmit, based on failing to successfully decode the uplink data packet after the set of physical uplink data channel occasions, a second activation message for the relay configuration and the uplink data packet. In some examples, the configuration component 1010 may transmit, after transmitting the activation message, a second activation message for the relay configuration, where the second activation message is for a second uplink data packet or the uplink data packet, and where the second activation message indicates a different order of transmission for the one or more relay UEs, a different set of UEs, or both relative to the activation message.

In some cases, the scheduling information includes an indication of a quantity of iterations for relaying the uplink data packet, each iteration of the quantity of iterations including a respective attempt to transmit the uplink data packet by each UE of the set of UEs. In some cases, the activation message includes a downlink control information message configured to activate the relay configuration for the set of UEs. In some cases, the activation message is in accordance with a downlink control information format dedicated to activation messages for relay configurations. In some cases, the activation message includes an indication of the set of UEs, the one or more relay UEs for relaying the uplink data packet, or both. In some cases, the activation message includes an indication of a relay order for relaying the uplink data packet by the one or more relay UEs, the relay order corresponding to an order of transmission for the one or more relay UEs.

In some cases, the activation message includes an indication of a quantity of iterations for relaying the uplink data packet by the one or more relay UEs, each iteration of the quantity of iterations including a respective attempt to transmit the uplink data packet by each UE of the set of UEs. In some cases, the activation message includes a scheduling grant for the set of physical uplink data channel occasions.

In some cases, the relay mode includes a first relay mode according to which a relay UE is to relay the uplink data packet during a respective physical uplink data channel occasion for the relay UE based on a successful decode of the uplink data packet by the relay UE during a prior physical uplink data channel occasion. In some cases, the relay mode includes a second relay mode according to which a relay UE is to relay signaling received by the relay UE during a prior physical uplink data channel occasion without attempting to decode the received signaling. In some cases, the different set of UEs excludes the source UE.

The monitoring component 1015 may monitor one or more physical uplink data channel occasions of the set of physical uplink data channel occasions after transmitting the indication of the relay configuration. In some examples, the monitoring component 1015 may commence the monitoring after transmitting the activation message.

The packet component 1020 may receive, based on the monitoring, the uplink data packet from a UE of the set of UEs during a physical uplink data channel occasion of the set of physical uplink data channel occasions. In some examples, the packet component 1020 may identify a priority associated with the uplink data packet, where the periodicity is based on the priority. In some examples, the packet component 1020 may fail to obtain the uplink data packet based on the signaling received from the source UE during the first physical uplink data channel occasion. In some examples, the packet component 1020 may fail to obtain the uplink data packet based on the signaling received from the first relay UE during the second physical uplink data channel occasion. In some examples, the packet component 1020 may attempt to obtain the uplink data packet based on the soft combining.

The feedback component 1025 may transmit, based on receiving the uplink data packet, a positive acknowledgement for the uplink data packet to the set of UEs during a physical downlink control channel occasion of the set of physical downlink control channel occasions, the physical downlink control channel occasion corresponding to the physical uplink data channel occasion, where the positive acknowledgement indicates that the relay configuration is deactivated for the uplink data packet. In some examples, transmitting the positive acknowledgement may include broadcasting or group casting the positive acknowledgement to the set of UEs.

In some examples, the feedback component 1025 may transmit, based on failing to obtain the uplink data packet based on the signaling received from the source UE during the first physical uplink data channel occasion, a negative acknowledgement for the uplink data packet to the set of UEs during a first physical downlink control channel occasion of the set of physical downlink control channel occasions, where the first physical downlink control channel occasion corresponds to the first physical uplink data channel occasion, and where the negative acknowledgement indicates that the relay configuration remains activated for the uplink data packet.

In some examples, the feedback component 1025 may transmit, based on failing to obtain the uplink data packet based on the signaling received from the first relay UE during the second physical uplink data channel occasion, a second negative acknowledgement for the uplink data packet to the set of UEs during a second physical downlink control channel occasion of the set of physical downlink control channel occasions, where the second physical downlink control channel occasion corresponds to the second physical uplink data channel occasion, and where second negative acknowledgement indicates that the relay configuration remains activated for the uplink data packet. In some examples, transmitting the negative acknowledgement or the second negative acknowledgement may include broadcasting or group casting the negative acknowledgement or the second negative acknowledgement to the set of UEs.

The capability component 1030 may receive, from each relay UE, a respective indication of a capability of the relay UE to operate in accordance with one or more relay modes of the set of relay modes, where selecting the respective relay mode for the relay UE is based on the respective indication of the capability of the relay UE.

The decoding component 1035 may fail to successfully decode the uplink data packet after a set of physical uplink data channel occasions that includes a respective physical uplink data channel occasion for each UE of the set of UEs.

The signaling component 1040 may receive signaling from the source UE during a first physical uplink data channel occasion of the set of physical uplink data channel occasions, the first physical uplink data channel occasion before the physical uplink data channel occasion during which the base station receives the uplink data packet. In some examples, the signaling component 1040 may receive signaling from a first relay UE of the one or more relay UEs during a second physical uplink data channel occasion of the set of physical uplink data channel occasions, the second physical uplink data channel occasion between the first physical uplink data channel occasion and the physical uplink data channel occasion during which the base station receives the uplink data packet. In some examples, the signaling component 1040 may perform soft combining based on the signaling received from the source UE during the first physical uplink data channel occasion and the signaling received from the first relay UE during the second physical uplink data channel occasion.

Figure 11:
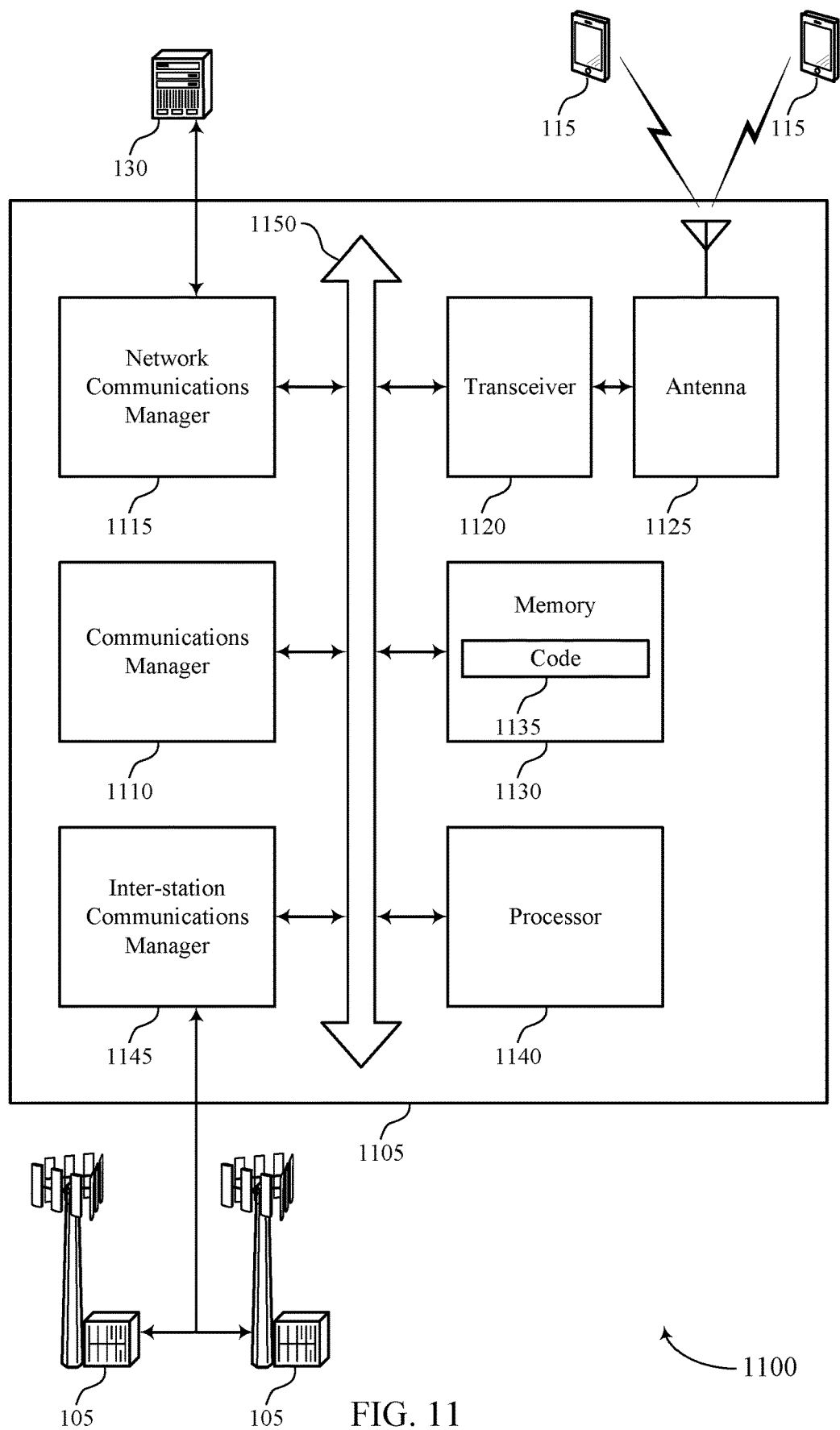
FIG. 11 shows a diagram of a system including a device that supports relaying and related configuration signaling for wireless communications in accordance with aspects of the present disclosure.

FIG. 11 shows a diagram of a system 1100 including a device 1105 that supports relaying and related configuration signaling for wireless communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a set of UEs, an indication of a relay configuration for the set of UEs, the relay configuration associated with a set of physical uplink data channel occasions and a corresponding set of physical downlink control channel occasions, where each physical uplink data channel occasion of the set of physical uplink data channel occasions is assigned to a respective UE of the set of UEs, and where the set of UEs includes a source UE for an uplink data packet and one or more relay UEs for relaying the uplink data packet. The communications manager 1110 may monitor one or more physical uplink data channel occasions of the set of physical uplink data channel occasions after transmitting the indication of the relay configuration, receive, based on the monitoring, the uplink data packet from a UE of the set of UEs during a physical uplink data channel occasion of the set of physical uplink data channel occasions. The communications manager 1110 may transmit, based on receiving the uplink data packet, a positive acknowledgement for the uplink data packet to the set of UEs during a physical downlink control channel occasion of the set of physical downlink control channel occasions, the physical downlink control channel occasion corresponding to the physical uplink data channel occasion, where the positive acknowledgement indicates that the relay configuration is deactivated for the uplink data packet.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting relaying and related configuration signaling for wireless communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
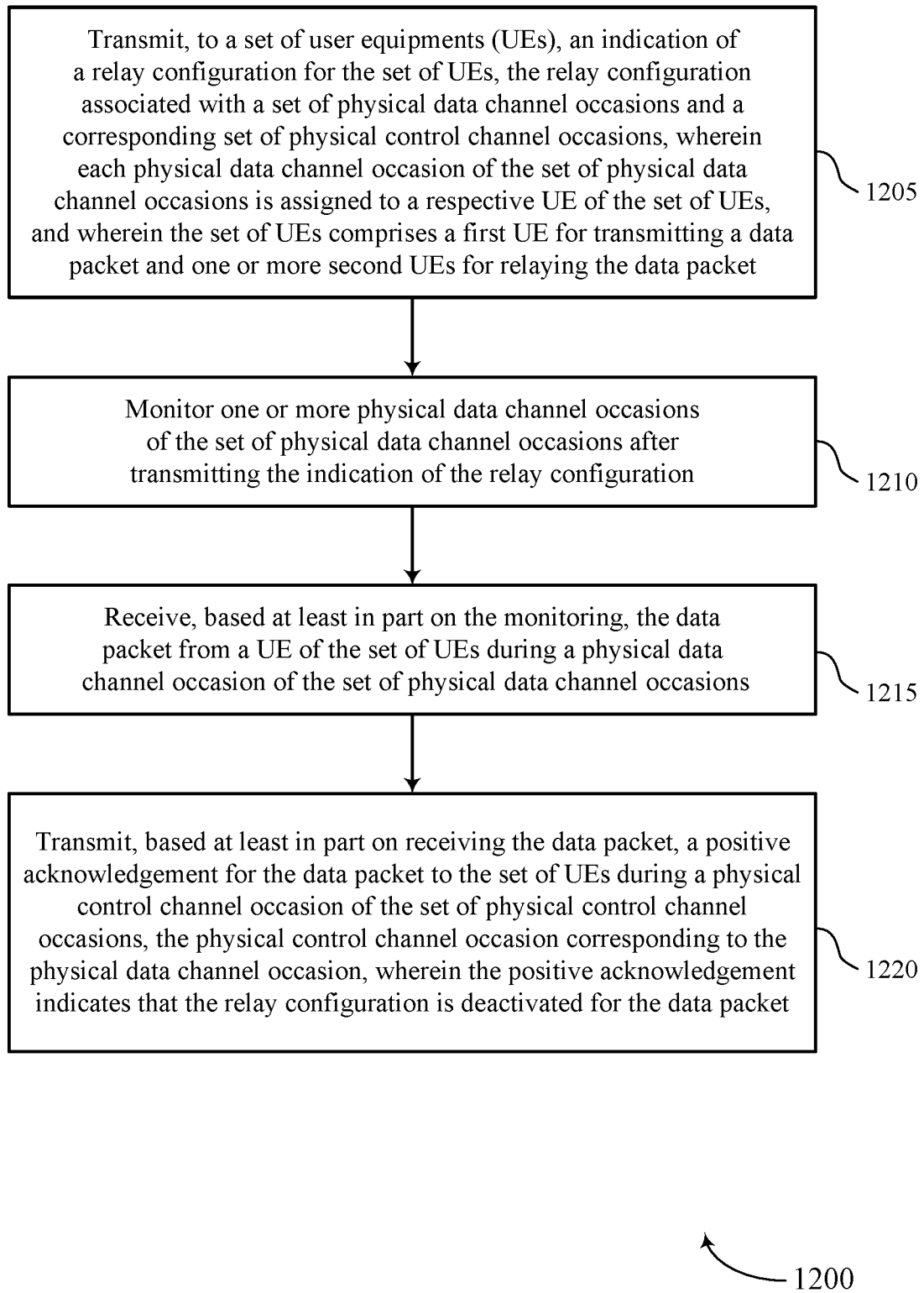
FIGS. 12 through 17 show flowcharts illustrating methods that support relaying and related configuration signaling for wireless communications in accordance with aspects of the present disclosure.

FIG. 12 shows a flowchart illustrating a method 1200 that supports relaying and related configuration signaling for wireless communications in accordance with aspects of the present disclosure. The operations of method 1200 may be implemented by a wireless device (e.g., base station 105) or its components as described herein. For example, the operations of method 1200 may be performed by a communications manager as described with reference to FIGS. 8 through 11. In some examples, a wireless device may execute a set of instructions to control the functional elements of the wireless device to perform the functions described below. Additionally, or alternatively, a wireless device may perform aspects of the functions described below using special-purpose hardware.

At 1205, the wireless device may transmit, to a set of user equipments (UEs), an indication of a relay configuration for the set of UEs, the relay configuration associated with a set of physical data channel occasions and a corresponding set of physical control channel occasions, wherein each physical data channel occasion of the set of physical data channel occasions is assigned to a respective UE of the set of UEs, and wherein the set of UEs comprises a first UE for transmitting a data packet and one or more second UEs for relaying the data packet. In some examples, transmitting the indication of the relay configuration may include transmitting semi-persistent scheduling information for the set of physical uplink data channel occasions, the set of physical downlink control channel occasions, or both. In some aspects, transmitting the scheduling information may include transmitting an indication of a periodicity associated with the set of physical data channel occasions, an indication of a temporal spacing between each physical data channel occasion of the set of physical data channel occasions and a corresponding physical control channel occasion of the set of physical control channel occasions, or both. The operations of 1205 may be performed according to the methods described herein. In some examples, aspects of the operations of 1205 may be performed by a configuration component as described with reference to FIGS. 8 through 11.

At 1210, the wireless device may monitor one or more physical data channel occasions of the set of physical data channel occasions after transmitting the indication of the relay configuration. The operations of 1210 may be performed according to the methods described herein. In some examples, aspects of the operations of 1210 may be performed by a monitoring component as described with reference to FIGS. 8 through 11.

At 1215, the wireless device may receive, based on the monitoring, the data packet from a UE of the set of UEs during a physical data channel occasion of the set of physical data channel occasions. The operations of 1215 may be performed according to the methods described herein. In some examples, aspects of the operations of 1215 may be performed by a packet component as described with reference to FIGS. 8 through 11.

At 1220, the wireless device may transmit, based at least in part on receiving the data packet, a positive acknowledgement for the data packet to the set of UEs during a physical control channel occasion of the set of physical control channel occasions, the physical control channel occasion corresponding to the physical data channel occasion, wherein the positive acknowledgement indicates that the relay configuration is deactivated for the data packet. The operations of 1220 may be performed according to the methods described herein. In some examples, aspects of the operations of 1220 may be performed by a feedback component as described with reference to FIGS. 8 through 11.

Figure 13:
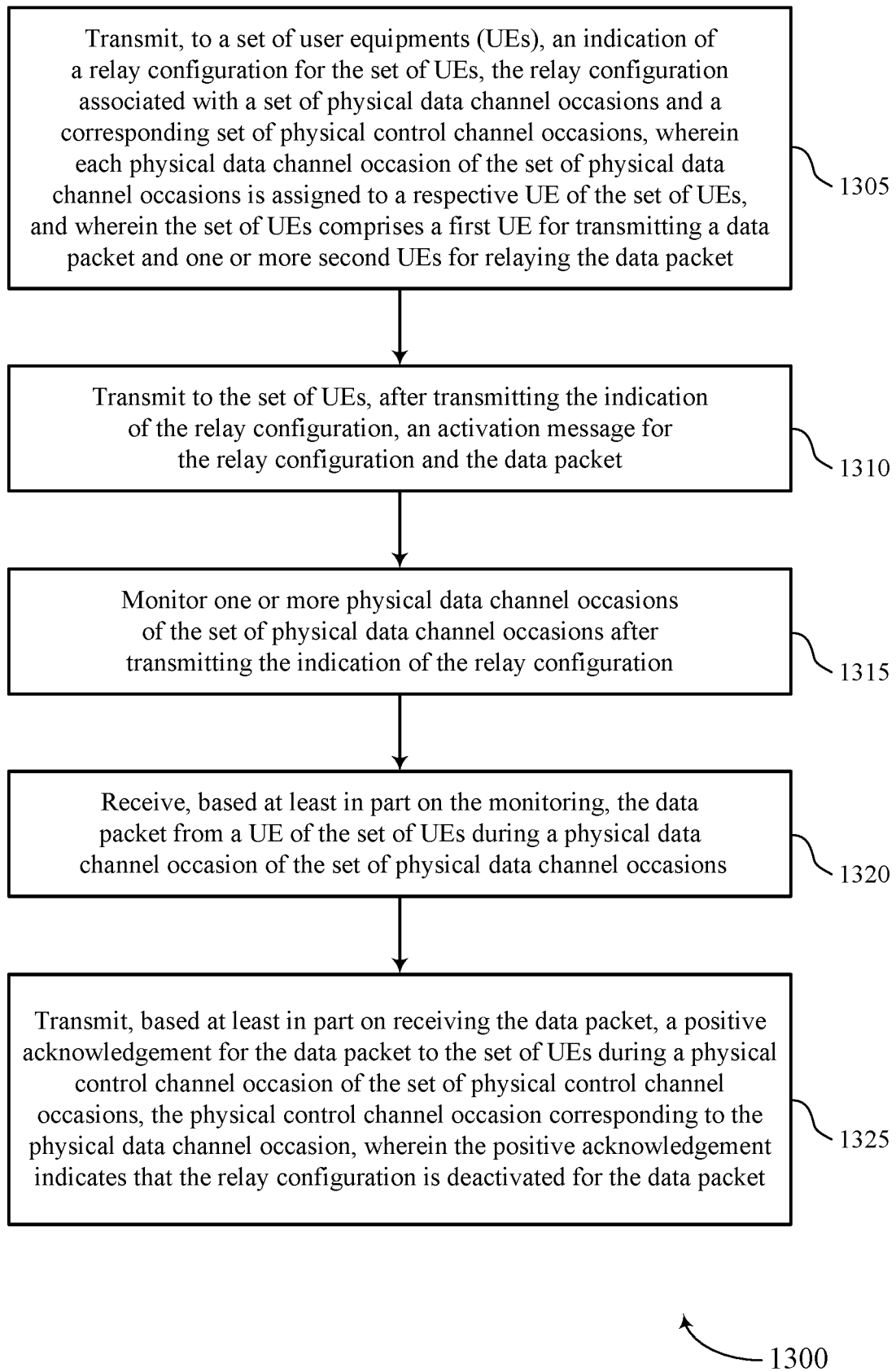

FIG. 13 shows a flowchart illustrating a method 1300 that supports relaying and related configuration signaling for wireless communications in accordance with aspects of the present disclosure. The operations of method 1300 may be implemented by a wireless device (e.g., base station 105) or its components as described herein. For example, the operations of method 1300 may be performed by a communications manager as described with reference to FIGS. 8 through 11. In some examples, a wireless device may execute a set of instructions to control the functional elements of the wireless device to perform the functions described below. Additionally, or alternatively, a wireless device may perform aspects of the functions described below using special-purpose hardware.

At 1305, the wireless device may transmit, to a set of UEs, an indication of a relay configuration for the set of UEs, the relay configuration associated with a set of physical data channel occasions and a corresponding set of physical control channel occasions, wherein each physical data channel occasion of the set of physical data channel occasions is assigned to a respective UE of the set of UEs, and wherein the set of UEs comprises a first UE for transmitting a data packet and one or more second UEs for relaying the data packet. The operations of 1305 may be performed according to the methods described herein. In some examples, aspects of the operations of 1305 may be performed by a configuration component as described with reference to FIGS. 8 through 11.

At 1310, the wireless device may transmit to the set of UEs, after transmitting the indication of the relay configuration, an activation message for the relay configuration and the data packet. In some examples, the activation message includes a downlink control information message configured to activate the relay configuration for the set of UEs. In some aspects, the activation message is in accordance with a downlink control information format dedicated to activation messages for relay configurations. The operations of 1310 may be performed according to the methods described herein. In some examples, aspects of the operations of 1310 may be performed by a configuration component as described with reference to FIGS. 8 through 11.

At 1315, the wireless device may monitor one or more physical data channel occasions of the set of physical data channel occasions after transmitting the indication of the relay configuration. In some cases, the base station may commence the monitoring after transmitting the activation message. The operations of 1315 may be performed according to the methods described herein. In some examples, aspects of the operations of 1315 may be performed by a monitoring component as described with reference to FIGS. 8 through 11.

At 1320, the wireless device may receive, based on the monitoring, the data packet from a UE of the set of UEs during a physical data channel occasion of the set of physical data channel occasions. The operations of 1320 may be performed according to the methods described herein. In some examples, aspects of the operations of 1320 may be performed by a packet component as described with reference to FIGS. 8 through 11.

At 1325, the wireless device may transmit, based on receiving the data packet, a positive acknowledgement for the data packet to the set of UEs during a physical control channel occasion of the set of physical control channel occasions, the physical control channel occasion corresponding to the physical data channel occasion, where the positive acknowledgement indicates that the relay configuration is deactivated for the data packet. The operations of 1325 may be performed according to the methods described herein. In some examples, aspects of the operations of 1325 may be performed by a feedback component as described with reference to FIGS. 8 through 11.

Figure 14:
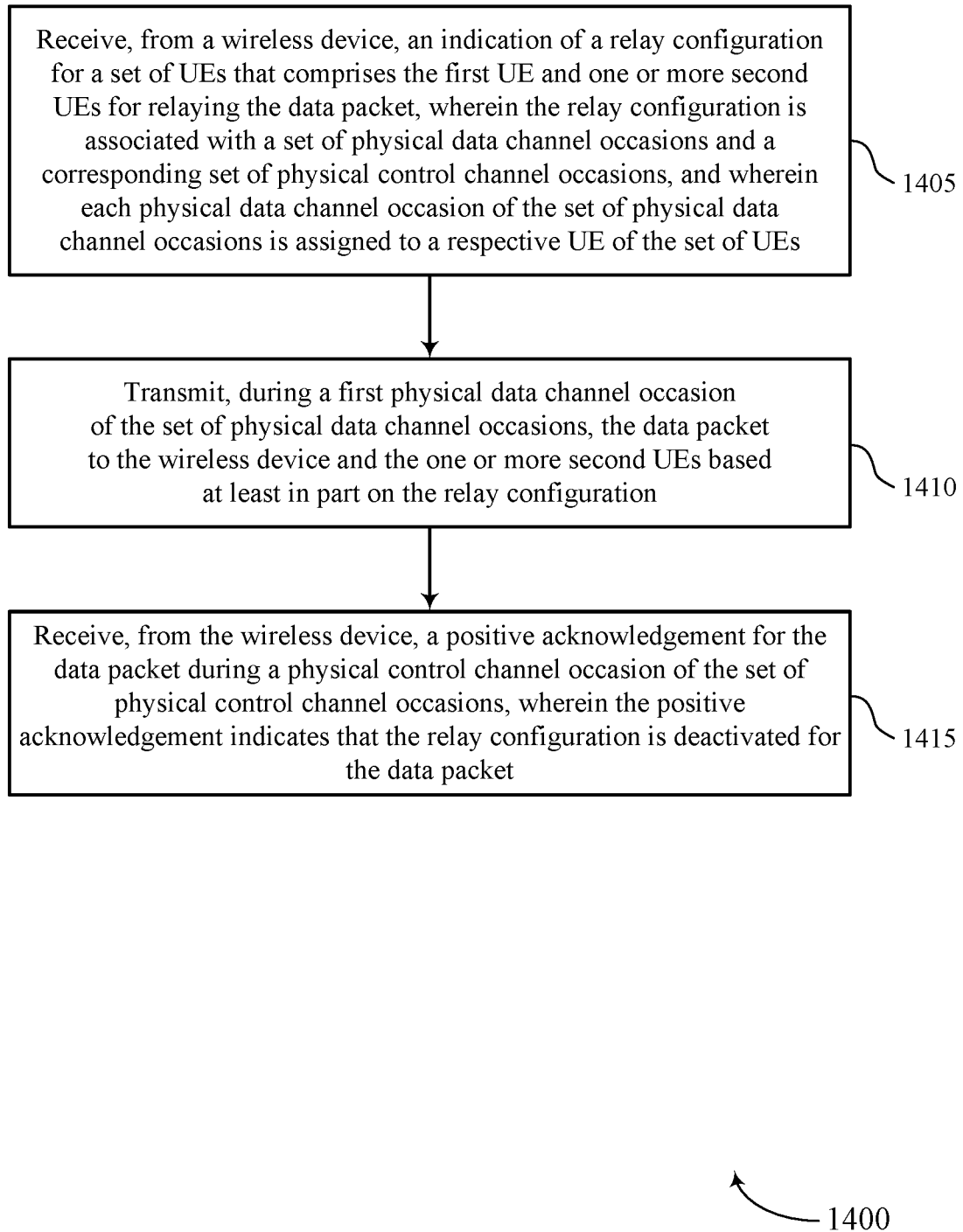

FIG. 14 shows a flowchart illustrating a method 1400 that supports relaying and related configuration signaling for wireless communications in accordance with aspects of the present disclosure. The operations of method 1400 may be implemented by a first UE 115 (e.g., a source UE 115) or its components as described herein. For example, the operations of method 1400 may be performed by a communications manager as described with reference to FIGS. 4 through 7. In some examples, a first UE may execute a set of instructions to control the functional elements of the first UE to perform the functions described below. Additionally, or alternatively, a first UE may perform aspects of the functions described below using special-purpose hardware.

At 1405, the first UE may receive, from a wireless device, an indication of a relay configuration for a set of UEs that comprises the first UE and one or more second UEs for relaying a data packet, wherein the relay configuration is associated with a set of physical data channel occasions and a corresponding set of physical control channel occasions, and wherein each physical data channel occasion of the set of physical data channel occasions is assigned to a respective UE of the set of UEs. In some examples, receiving the indication may include receiving semi-persistent scheduling information for the set of physical data channel occasions, the set of physical control channel occasions, or both. In some examples, receiving the scheduling information may include receiving an indication of a periodicity associated with the set of physical data channel occasions, an indication of a temporal spacing between each physical data channel occasion of the set of physical data channel occasions and a corresponding physical control channel occasion of the set of physical control channel occasions, or both. In some aspects, receiving the scheduling information may include receiving a RRC message or a MAC-CE that includes at least a portion of the scheduling information. The operations of 1405 may be performed according to the methods described herein. In some examples, aspects of the operations of 1405 may be performed by a configuration component as described with reference to FIGS. 4 through 7.

At 1410, the first UE may transmit, during a first physical data channel occasion of the set of physical data channel occasions, a data packet to the wireless device and the one or more second UEs based on the relay configuration. The operations of 1410 may be performed according to the methods described herein. In some examples, aspects of the operations of 1410 may be performed by a packet component as described with reference to FIGS. 4 through 7.

At 1415, the first UE may receive, from the wireless device, a positive acknowledgement for the data packet during a physical control channel occasion of the set of physical control channel occasions, where the positive acknowledgement indicates that the relay configuration is deactivated for the data packet. The operations of 1415 may be performed according to the methods described herein. In some examples, aspects of the operations of 1415 may be performed by a feedback component as described with reference to FIGS. 4 through 7.

Figure 15:
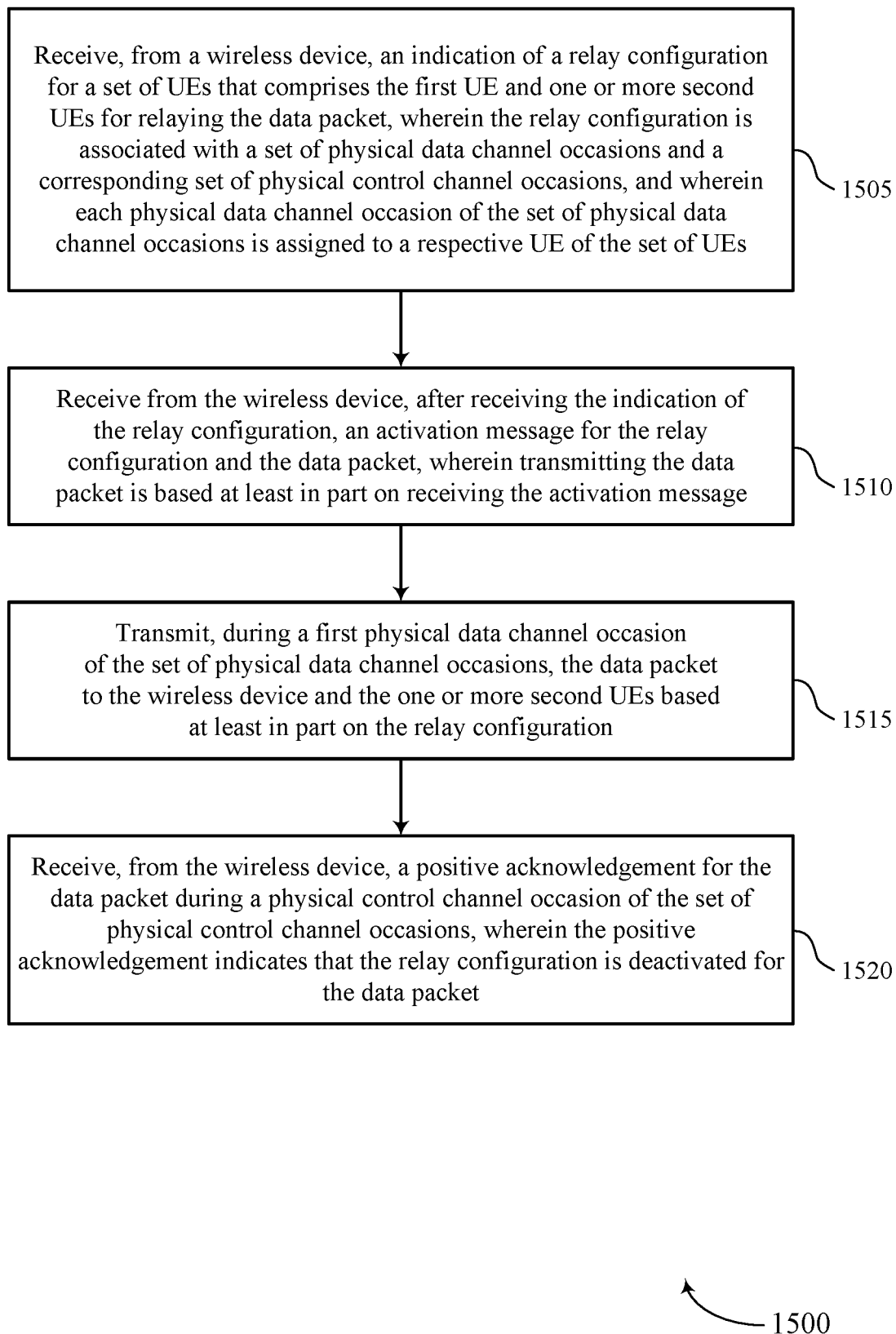

FIG. 15 shows a flowchart illustrating a method 1500 that supports relaying and related configuration signaling for wireless communications in accordance with aspects of the present disclosure. The operations of method 1500 may be implemented by a first UE 115 or its components as described herein. For example, the operations of method 1500 may be performed by a communications manager as described with reference to FIGS. 4 through 7. In some examples, a first UE may execute a set of instructions to control the functional elements of the first UE to perform the functions described below. Additionally, or alternatively, a first UE may perform aspects of the functions described below using special-purpose hardware.

At 1505, the first UE may receive, from a wireless device, an indication of a relay configuration for a set of UEs that comprises the first UE and one or more second UEs for relaying a data packet, wherein the relay configuration is associated with a set of physical data channel occasions and a corresponding set of physical control channel occasions, and wherein each physical data channel occasion of the set of physical data channel occasions is assigned to a respective UE of the set of UEs. The operations of 1505 may be performed according to the methods described herein. In some examples, aspects of the operations of 1505 may be performed by a configuration component as described with reference to FIGS. 4 through 7.

At 1510, the first UE may receive from the wireless device, after receiving the indication of the relay configuration, an activation message for the relay configuration and the data packet, wherein transmitting the data packet is based at least in part on receiving the activation message. In some aspects, the activation message is in accordance with a downlink control information format dedicated to activation messages for relay configurations. The operations of 1510 may be performed according to the methods described herein. In some examples, aspects of the operations of 1510 may be performed by a configuration component as described with reference to FIGS. 4 through 7.

At 1515, the first UE may transmit, during a first physical data channel occasion of the set of physical data channel occasions, the data packet to the wireless device and the one or more second UEs based at least in part on the relay configuration. In some aspects, transmitting the data packet is based on receiving the activation message. The operations of 1515 may be performed according to the methods described herein. In some examples, aspects of the operations of 1515 may be performed by a packet component as described with reference to FIGS. 4 through 7.

At 1520, the first UE may receive, from the wireless device, a positive acknowledgement for the data packet during a physical control channel occasion of the set of physical control channel occasions, wherein the positive acknowledgement indicates that the relay configuration is deactivated for the data packet. The operations of 1520 may be performed according to the methods described herein. In some examples, aspects of the operations of 1520 may be performed by a feedback component as described with reference to FIGS. 4 through 7.

Figure 16:
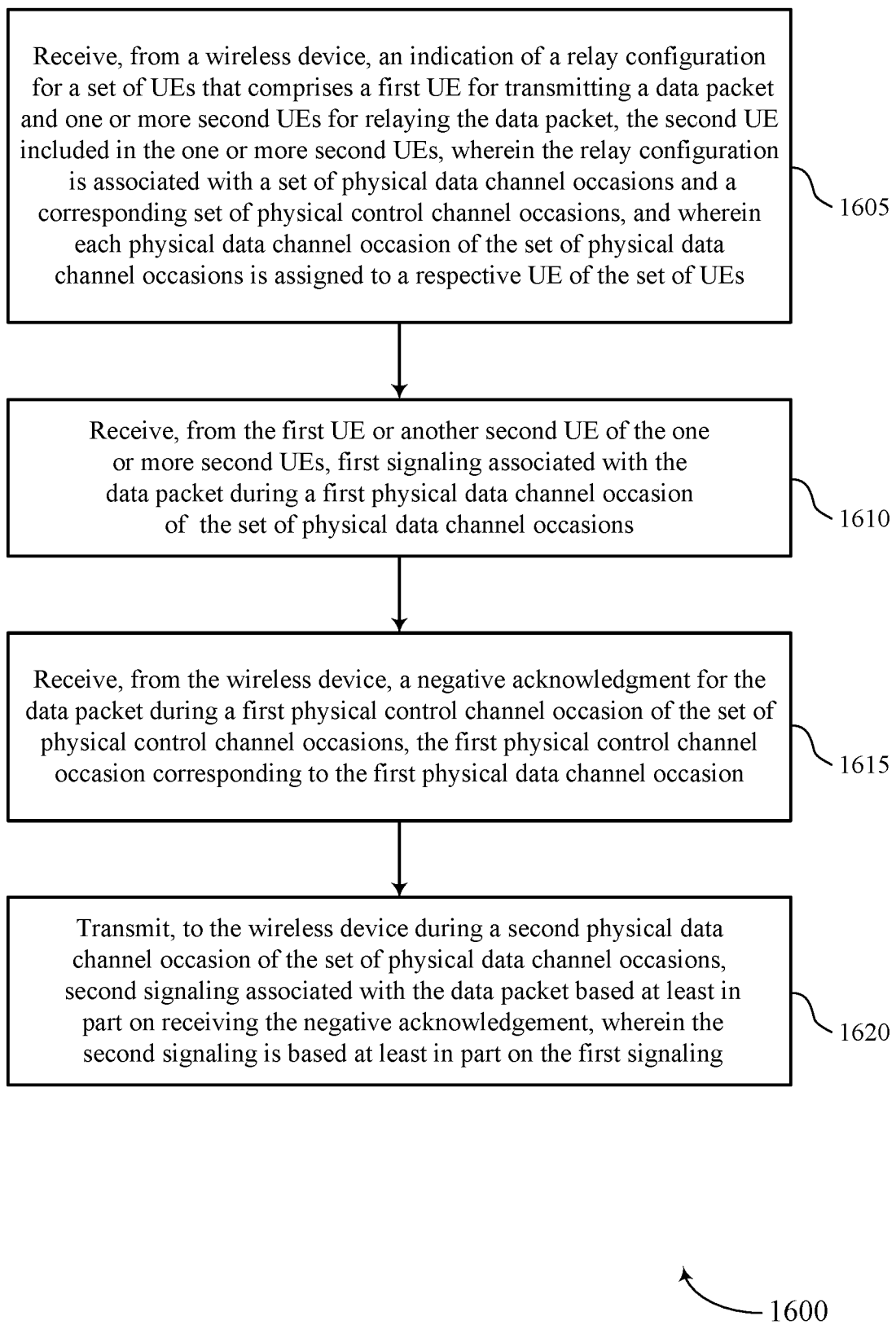

FIG. 16 shows a flowchart illustrating a method 1600 that supports relaying and related configuration signaling for wireless communications in accordance with aspects of the present disclosure. The operations of method 1600 may be implemented by a second UE 115 or its components as described herein. For example, the operations of method 1600 may be performed by a communications manager as described with reference to FIGS. 4 through 7. In some examples, a second UE may execute a set of instructions to control the functional elements of the second UE to perform the functions described below. Additionally, or alternatively, a second UE may perform aspects of the functions described below using special-purpose hardware.

At 1605, the second UE may receive, from a wireless device, an indication of a relay configuration for a set of UEs that comprises a first UE for transmitting a data packet and one or more second UEs for relaying the data packet, the second UE included in the one or more second UEs, wherein the relay configuration is associated with a set of physical data channel occasions and a corresponding set of physical control channel occasions, and wherein each physical data channel occasion of the set of physical data channel occasions is assigned to a respective UE of the set of UEs. In some examples, receiving the indication may include receiving semi-persistent scheduling information for the set of physical data channel occasions, the set of physical control channel occasions, or both. In some aspects, receiving the scheduling information may include receiving an indication of a periodicity associated with the set of physical data channel occasions, an indication of a temporal spacing between each physical data channel occasion of the set of physical data channel occasions and a corresponding physical control channel occasion of the set of physical control channel occasions, or both. The operations of 1605 may be performed according to the methods described herein. In some examples, aspects of the operations of 1605 may be performed by a configuration component as described with reference to FIGS. 4 through 7.

At 1610, the second UE may receive, from the first UE or another second UE of the one or more second UEs, first signaling associated with the data packet during a first physical data channel occasion of the set of physical data channel occasions. The operations of 1610 may be performed according to the methods described herein. In some examples, aspects of the operations of 1610 may be performed by a signaling component as described with reference to FIGS. 4 through 7.

At 1615, the second UE may receive, from the wireless device, a negative acknowledgment for the data packet during a first physical control channel occasion of the set of physical control channel occasions, the first physical control channel occasion corresponding to the first physical data channel occasion. The operations of 1615 may be performed according to the methods described herein. In some examples, aspects of the operations of 1615 may be performed by a feedback component as described with reference to FIGS. 4 through 7.

At 1620, the second UE may transmit, to the wireless device during a second physical data channel occasion of the set of physical data channel occasions, second signaling associated with the data packet based on receiving the negative acknowledgement, where the second signaling is based on the first signaling. The operations of 1620 may be performed according to the methods described herein. In some examples, aspects of the operations of 1620 may be performed by a signaling component as described with reference to FIGS. 4 through 7.

Figure 17:
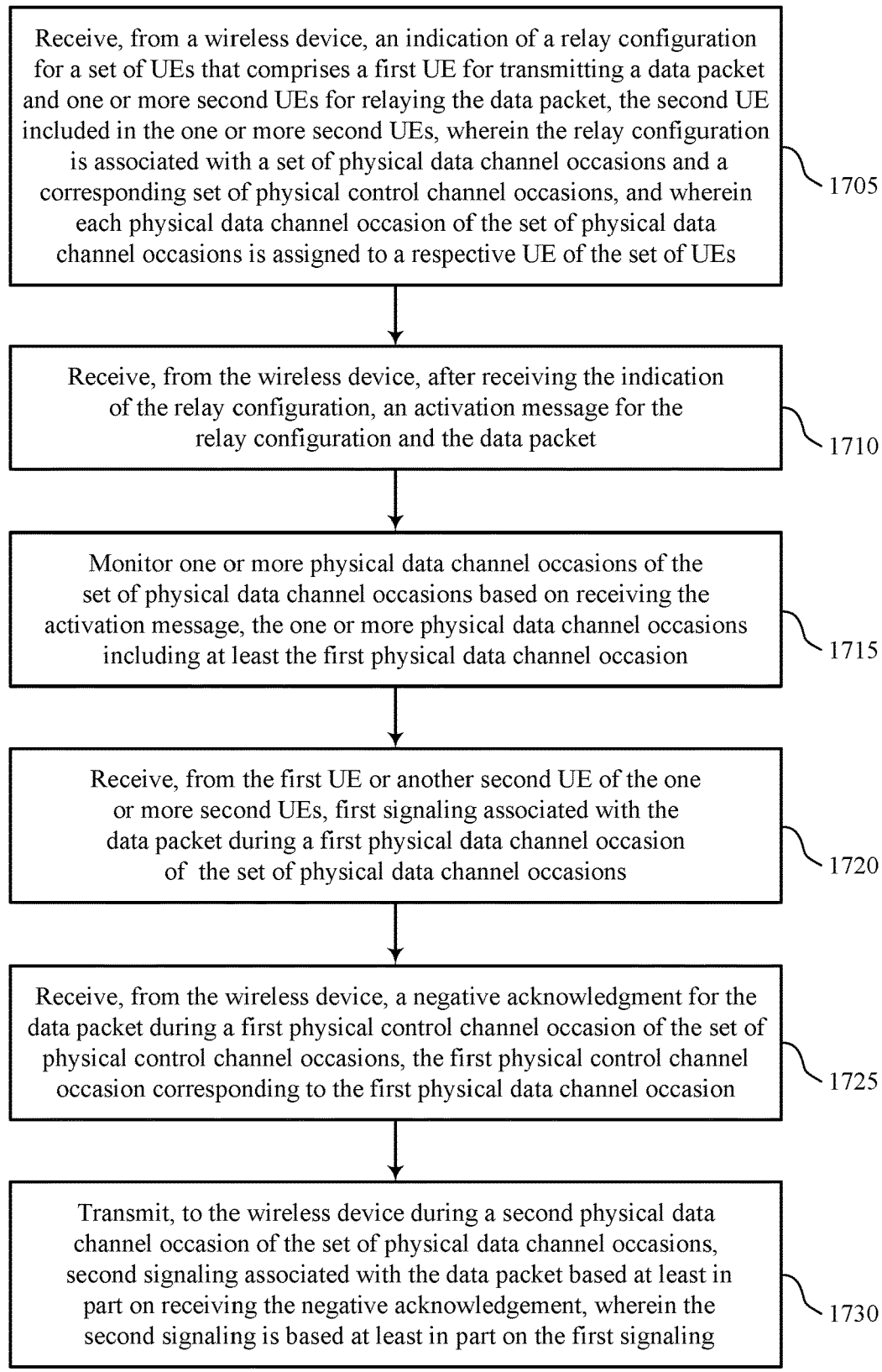

FIG. 17 shows a flowchart illustrating a method 1700 that supports relaying and related configuration signaling for wireless communications in accordance with aspects of the present disclosure. The operations of method 1700 may be implemented by a second UE 115 or its components as described herein. For example, the operations of method 1700 may be performed by a communications manager as described with reference to FIGS. 4 through 7. In some examples, a second UE may execute a set of instructions to control the functional elements of the second UE to perform the functions described below. Additionally, or alternatively, a second UE may perform aspects of the functions described below using special-purpose hardware.

At 1705, the second UE may receive, from a wireless device, an indication of a relay configuration for a set of UEs that comprises a first UE for transmitting a data packet and one or more second UEs for relaying the data packet, the second UE included in the one or more second UEs, wherein the relay configuration is associated with a set of physical data channel occasions and a corresponding set of physical control channel occasions, and wherein each physical data channel occasion of the set of physical data channel occasions is assigned to a respective UE of the set of UEs. The operations of 1705 may be performed according to the methods described herein. In some examples, aspects of the operations of 1705 may be performed by a configuration component as described with reference to FIGS. 4 through 7.

At 1710, the second UE may receive from the wireless device, after receiving the indication of the relay configuration, an activation message for the relay configuration and the data packet. In some examples, the activation message includes a downlink control information message configured to activate the relay configuration for the set of UEs. In some aspects, the activation message is in accordance with a downlink control information format dedicated to activation messages for relay configurations. The operations of 1710 may be performed according to the methods described herein. In some examples, aspects of the operations of 1710 may be performed by a configuration component as described with reference to FIGS. 4 through 7.

At 1715, the second UE may monitor one or more physical data channel occasions of the set of physical data channel occasions based on receiving the activation message, the one or more physical data channel occasions including at least the first physical data channel occasion. The operations of 1715 may be performed according to the methods described herein. In some examples, aspects of the operations of 1715 may be performed by a monitoring component as described with reference to FIGS. 4 through 7.

At 1720, the second UE may receive, from the first UE or another second UE of the one or more second UEs, first signaling associated with the data packet during a first physical data channel occasion of the set of physical data channel occasions. The operations of 1720 may be performed according to the methods described herein. In some examples, aspects of the operations of 1720 may be performed by a signaling component as described with reference to FIGS. 4 through 7.

At 1725, the second UE may receive, from the wireless device, a negative acknowledgment for the data packet during a first physical control channel occasion of the set of physical control channel occasions, the first physical control channel occasion corresponding to the first physical data channel occasion. The operations of 1725 may be performed according to the methods described herein. In some examples, aspects of the operations of 1725 may be performed by a feedback component as described with reference to FIGS. 4 through 7.

At 1730, the second UE may transmit, to the wireless device during a second physical data channel occasion of the set of physical data channel occasions, second signaling associated with the data packet based on receiving the negative acknowledgement, where the second signaling is based on the first signaling. The operations of 1730 may be performed according to the methods described herein. In some examples, aspects of the operations of 1730 may be performed by a signaling component as described with reference to FIGS. 4 through 7.

The following provides an overview of aspects of the present disclosure:

Aspect 1: A method for wireless communication at a wireless device (e.g., base station), comprising: transmitting, to a set of user equipments (UEs), an indication of a relay configuration for the set of UEs, the relay configuration associated with a set of physical data channel occasions and a corresponding set of physical control channel occasions, wherein each physical data channel occasion of the set of physical data channel occasions is assigned to a respective UE of the set of UEs, and wherein the set of UEs comprises a first UE for transmitting a data packet and one or more second UEs for relaying the data packet; monitoring one or more physical data channel occasions of the set of physical data channel occasions after transmitting the indication of the relay configuration; receiving, based at least in part on the monitoring, the data packet from a UE of the set of UEs during a physical data channel occasion of the set of physical data channel occasions; and transmitting, based at least in part on receiving the data packet, a positive acknowledgement for the data packet to the set of UEs during a physical control channel occasion of the set of physical control channel occasions, the physical control channel occasion corresponding to the physical data channel occasion, wherein the positive acknowledgement indicates that the relay configuration is deactivated for the data packet.

Aspect 2: The method of aspect 1, wherein transmitting the indication of the relay configuration comprises: transmitting semi-persistent scheduling information for the set of physical data channel occasions, the set of physical control channel occasions, or both.

Aspect 3: The method of aspect 2, wherein transmitting the scheduling information comprises: transmitting an indication of a periodicity associated with the set of physical data channel occasions, an indication of a temporal spacing between each physical data channel occasion of the set of physical data channel occasions and a corresponding physical control channel occasion of the set of physical control channel occasions, or both.

Aspect 4: The method of aspect 3, further comprising: identifying a priority associated with the data packet, wherein the periodicity is based at least in part on the priority.

Aspect 5: The method of any of aspects 2 through 4, wherein transmitting the scheduling information comprises: transmitting a radio resource control message or a media access control-control element that comprises at least a portion of the scheduling information.

Aspect 6: The method of any of aspects 2 through 5, wherein the scheduling information comprises an indication of a quantity of iterations for relaying the data packet, each iteration of the quantity of iterations comprising a respective attempt to transmit the data packet by each UE of the set of UEs.

Aspect 7: The method of any of aspects 1 through 6, wherein transmitting the positive acknowledgement comprises broadcasting or group casting the positive acknowledgement to the set of UEs.

Aspect 8: The method of any of aspects 1 through 7, further comprising: transmitting to the set of UEs, after transmitting the indication of the relay configuration, an activation message for the relay configuration and the data packet; and commencing the monitoring after transmitting the activation message.

Aspect 9: The method of aspect 8, wherein the activation message comprises a control information message configured to activate the relay configuration for the set of UEs.

Aspect 10: The method of aspect 9, wherein the activation message is in accordance with a control information format dedicated to activation messages for relay configurations.

Aspect 11: The method of any of aspects 8 through 10, wherein transmitting the activation message comprises broadcasting or group casting the activation message to the set of UEs.

Aspect 12: The method of any of aspects 8 through 11, wherein transmitting the indication of the relay configuration to the set of UEs comprises transmitting the indication of the relay configuration to a superset of UEs that comprises the set of UEs and one or more additional UEs; and the activation message comprises an indication of the set of UEs, the one or more second UEs for relaying the data packet, or both.

Aspect 13: The method of any of aspects 8 through 12, wherein the activation message comprises an indication of a relay order for relaying the data packet by the one or more second UEs, the relay order corresponding to an order of transmission for the one or more second UEs.

Aspect 14: The method of any of aspects 8 through 13, wherein the activation message comprises an indication of a quantity of iterations for relaying the data packet by the one or more second UEs, each iteration of the quantity of iterations comprising a respective attempt to transmit the data packet by each UE of the set of UEs.

Aspect 15: The method of any of aspects 8 through 14, wherein the activation message comprises a scheduling grant for the set of physical data channel occasions.

Aspect 16: The method of any of aspects 8 through 15, further comprising: selecting, from a set of relay modes, a relay mode for the one or more second UEs, wherein the activation message comprises an indication of the relay mode for the one or more second UEs.

Aspect 17: The method of aspect 16, wherein the relay mode comprises a first relay mode according to which a second UE of the one or more second UEs is to relay the data packet during a respective physical data channel occasion for the second UE based at least in part on a successful decode of the data packet by the second UE during a prior physical data channel occasion.

Aspect 18: The method of any of aspects 16 through 17, wherein the relay mode comprises a second relay mode according to which a second UE of the one or more second UEs is to relay signaling received by the second UE during a prior physical data channel occasion without attempting to decode the received signaling.

Aspect 19: The method of any of aspects 8 through 18, further comprising: selecting, from a set of relay modes, a respective relay mode for each second UE of the one or more second UEs, wherein the activation message comprises an indication of the respective relay mode for each second UE.

Aspect 20: The method of aspect 19, further comprising: receiving, from each second UE of the one or more second UEs, a respective indication of a capability of the second UE to operate in accordance with one or more relay modes of the set of relay modes, wherein selecting the respective relay mode for each second UE of the one or more second UEs is based at least in part on the respective indication of the capability of the second UE.

Aspect 21: The method of any of aspects 8 through 20, further comprising: transmitting, based at least in part on receiving the data packet, a second activation message for the relay configuration and a second uplink data packet.

Aspect 22: The method of any of aspects 8 through 21, further comprising: failing to successfully decode the data packet after a plurality of physical data channel occasions that comprises a respective physical data channel occasion for each UE of the set of UEs; and transmitting, based at least in part on failing to successfully decode the data packet after the plurality of physical data channel occasions, a second activation message for the relay configuration and the data packet.

Aspect 23: The method of any of aspects 8 through 22, further comprising: transmitting, after transmitting the activation message, a second activation message for the relay configuration, wherein the second activation message is for a second data packet or the data packet, and wherein the second activation message indicates a different order of transmission for the one or more second UEs, a different set of UEs, or both relative to the activation message.

Aspect 24: The method of aspect 23, wherein the different set of UEs excludes the first UE.

Aspect 25: The method of any of aspects 1 through 24, further comprising: receiving signaling from the first UE during a first physical data channel occasion of the set of physical data channel occasions, the first physical data channel occasion before the physical data channel occasion during which the wireless device receives the data packet; failing to obtain the data packet based on the signaling received from the first UE during the first physical data channel occasion; and transmitting, based at least in part on failing to obtain the data packet based on the signaling received from the first UE during the first physical data channel occasion, a negative acknowledgement for the data packet to the set of UEs during a first physical control channel occasion of the set of physical control channel occasions, wherein the first physical control channel occasion corresponds to the first physical data channel occasion, and wherein the negative acknowledgement indicates that the relay configuration remains activated for the data packet.

Aspect 26: The method of aspect 25, further comprising: receiving signaling from a second UE of the one or more second UEs during a second physical data channel occasion of the set of physical data channel occasions, the second physical data channel occasion between the first physical data channel occasion and the physical data channel occasion during which the wireless device receives the data packet; failing to obtain the data packet based on the signaling received from the second UE during the second physical data channel occasion; and transmitting, based at least in part on failing to obtain the data packet based on the signaling received from the second UE during the second physical data channel occasion, a second negative acknowledgement for the data packet to the set of UEs during a second physical control channel occasion of the set of physical control channel occasions, wherein the second physical control channel occasion corresponds to the second physical data channel occasion, and wherein the second negative acknowledgement indicates that the relay configuration remains activated for the data packet.

Aspect 27: The method of aspect 26, further comprising: performing soft combining based at least in part on the signaling received from the first UE during the first physical data channel occasion and the signaling received from the third UE during the second physical data channel occasion; and attempting to obtain the data packet based at least in part on the soft combining.

Aspect 28: The method of any of aspects 25 through 27, wherein transmitting the negative acknowledgement comprises broadcasting or group casting the negative acknowledgement to the set of UEs.

Aspect 29: A method for wireless communication at a first UE, comprising: receiving, from a wireless device, an indication of a relay configuration for a set of UEs that comprises the first UE and one or more second UEs for relaying a data packet, wherein the relay configuration is associated with a set of physical data channel occasions and a corresponding set of physical control channel occasions, and wherein each physical data channel occasion of the set of physical data channel occasions is assigned to a respective UE of the set of UEs; transmitting, during a first physical data channel occasion of the set of physical data channel occasions, the data packet to the wireless device and the one or more second UEs based at least in part on the relay configuration; and receiving, from the wireless device, a positive acknowledgement for the data packet during a physical control channel occasion of the set of physical control channel occasions, wherein the positive acknowledgement indicates that the relay configuration is deactivated for the data packet.

Aspect 30: The method of aspect 29, wherein receiving the indication of the relay configuration comprises: receiving semi-persistent scheduling information for the set of physical data channel occasions, the set of physical control channel occasions, or both.

Aspect 31: The method of aspect 30, wherein receiving the scheduling information comprises: receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

Aspect 32: The method of any of aspects 30 through 31, wherein receiving the scheduling information comprises: receiving a radio resource control message or a media access control-control element that comprises at least a portion of the scheduling information.

Aspect 33: The method of any of aspects 29 through 32, further comprising: receiving from the base station, after receiving the indication of the relay configuration, an activation message for the relay configuration and the data packet, wherein transmitting the data packet is based at least in part on receiving the activation message.

Aspect 34: The method of aspect 33, wherein the activation message comprises a control information message configured to activate the relay configuration for the set of UEs.

Aspect 35: The method of aspect 34, wherein the activation message is in accordance with a control information format dedicated to activation messages for relay configurations.

Aspect 36: The method of any of aspects 33 through 35, wherein the activation message comprises an indication of a quantity of iterations for relaying the data packet, each iteration of the quantity of iterations comprising a respective attempt to transmit the data packet by each UE of the set of UEs.

Aspect 37: The method of any of aspects 33 through 36, wherein the activation message comprises a scheduling grant for the first UE to transmit the data packet during the first physical data channel occasion.

Aspect 38: The method of any of aspects 33 through 37, further comprising: receiving a second activation message for the relay configuration and a second uplink data packet.

Aspect 39: The method of any of aspects 33 through 38, further comprising: receiving, for each of the one or more second UEs, a negative acknowledgement for a corresponding physical data channel occasion of the set of physical data channel occasions; and receiving, after receiving the negative acknowledgement for the corresponding physical data channel occasion for each of the one or more second UEs, a second activation message for the relay configuration and the data packet.

Aspect 40: The method of any of aspects 29 through 39, further comprising: receiving, from the wireless device, a negative acknowledgement for the data packet during a first physical control channel occasion of the set of physical control channel occasions, wherein the first physical control channel occasion corresponds to the first physical data channel occasion, and wherein the negative acknowledgement indicates that the relay configuration remains activated for the data packet.

Aspect 41: A method for wireless communication at a second UE, comprising: receiving, from a wireless device, an indication of a relay configuration for a set of UEs that comprises a first UE for transmitting a data packet and one or more second UEs for relaying the data packet, the second UE included in the one or more second UEs, wherein the relay configuration is associated with a set of physical data channel occasions and a corresponding set of physical control channel occasions, and wherein each physical data channel occasion of the set of physical data channel occasions is assigned to a respective UE of the set of UEs; receiving, from the first UE or another second UE of the one or more second UEs, first signaling associated with the data packet during a first physical data channel occasion of the set of physical data channel occasions; receiving, from the wireless device, a negative acknowledgment for the data packet during a first physical control channel occasion of the set of physical control channel occasions, the first physical control channel occasion corresponding to the first physical data channel occasion; and transmitting, to the wireless device during a second physical data channel occasion of the set of physical data channel occasions, second signaling associated with the data packet based at least in part on receiving the negative acknowledgement, wherein the second signaling is based at least in part on the first signaling.

Aspect 42: The method of aspect 41, wherein receiving the indication of the relay configuration comprises: receiving semi-persistent scheduling information for the set of physical data channel occasions, the set of physical control channel occasions, or both.

Aspect 43: The method of aspect 42, wherein receiving the scheduling information comprises: receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

Aspect 44: The method of any of aspects 42 through 43, wherein receiving the scheduling information comprises: receiving a radio resource control message or a media access control-control element that comprises at least a portion of the scheduling information.

Aspect 45: The method of any of aspects 42 through 44, wherein the scheduling information comprises an indication of a quantity of iterations for relaying the data packet by the one or more second UEs, each iteration of the quantity of iterations comprising a respective attempt to transmit the data packet by each UE of the set of UEs.

Aspect 46: The method of any of aspects 41 through 45, further comprising: receiving from the wireless device, after receiving the indication of the relay configuration, an activation message for the relay configuration and the data packet; and monitoring one or more physical data channel occasions of the set of physical data channel occasions based on receiving the activation message, the one or more physical data channel occasions comprising at least the first physical data channel occasion.

Aspect 47: The method of aspect 46, wherein the activation message comprises a control information message configured to activate the relay configuration for the set of UEs.

Aspect 48: The method of aspect 47, wherein the activation message is in accordance with a control information format dedicated to activation messages for relay configurations.

Aspect 49: The method of any of aspects 46 through 48, wherein the activation message comprises an indication of the set of UEs, the one or more second UEs for relaying the data packet, or both.

Aspect 50: The method of any of aspects 46 through 49, wherein the activation message comprises an indication of a relay order for relaying the data packet by the one or more second UEs, the relay order corresponds to an order of transmission for the one or more second UEs, and transmitting the second signaling during the second physical data channel occasion is based at least in part on the relay order.

Aspect 51: The method of any of aspects 46 through 50, wherein the activation message comprises an indication of a quantity of iterations for relaying the data packet, each iteration of the quantity of iterations comprising a respective attempt to transmit the data packet by each UE of the set of UEs.

Aspect 52: The method of any of aspects 46 through 51, wherein the activation message comprises a scheduling grant for the first UE to transmit the second signaling during the second physical data channel occasion.

Aspect 53: The method of any of aspects 46 through 52, wherein the activation message comprises an indication that the second UE is to relay the data packet in accordance with a first relay mode; and attempting to decode the signaling received during the first physical data channel occasion based at least in part on the indication to relay the data packet in accordance with the first relay mode, wherein transmitting the second signaling during the second physical data channel occasion in accordance with the first relay mode is based at least in part on successfully decoding the signaling received during the first physical data channel occasion to obtain the data packet.

Aspect 54: The method of any of aspects 46 through 53, wherein the activation message comprises an indication that the second UE is to relay the data packet in accordance with a second relay mode; and refraining from attempting to decode the signaling received during the first physical data channel occasion before transmitting the second signaling during the second physical data channel occasion based at least in part on the indication to relay the data packet in accordance with the second relay mode.

Aspect 55: The method of aspect 54, further comprising: determining that a received signal power for the first signaling received during the first physical data channel occasion satisfies a threshold, wherein transmitting the second signaling during the second physical data channel occasion in accordance with the second relay mode is based at least in part on the received signal power for the first signaling satisfying the threshold.

Aspect 56: The method of any of aspects 41 through 55, further comprising: transmitting, to the wireless device, an indication of a capability of the second UE to relay the data packet in accordance with a first relay mode, a second relay mode, or both.

Aspect 57: The method of any of aspects 41 through 56, further comprising: receiving, from the wireless device, a second negative acknowledgement for the data packet during a second physical control channel occasion of the set of physical control channel occasions, the second physical control channel occasion corresponding to the second physical data channel occasion, wherein the second negative acknowledgement indicates that the relay configuration remains activated for the data packet.

Aspect 58: The method of any of aspects 41 through 57, further comprising: receiving, from the wireless device, a positive acknowledgement for the data packet during a second physical control channel occasion of the set of physical control channel occasions, the second physical control channel occasion corresponding to the second physical data channel occasion, wherein the positive acknowledgement indicates that the relay configuration is deactivated for the data packet.

Aspect 59: The method of any of aspects 41 through 58, further comprising: receiving, from at least one other second UE of the one or more second UEs, third signaling associated with the data packet during a third physical data channel occasion of the set of physical data channel occasions, the third physical data channel occasion between the first physical data channel occasion and the second physical data channel occasion; performing soft combining based at least in part on the first signaling and the third signaling; and generating the second signaling is based at least in part on the soft combining.

Aspect 60: An apparatus for wireless communication at a wireless device, comprising at least one processor; memory coupled with the at least one processor, the memory storing instructions executable by the processor to cause the apparatus to perform a method of any of aspects 1 through 28.

Aspect 61: An apparatus for wireless communication at a wireless device, comprising at least one means for performing a method of any of aspects 1 through 28.

Aspect 62: A non-transitory computer-readable medium storing code for wireless communication at a base station, the code comprising instructions executable by at least one processor to perform a method of any of aspects 1 through 28.

Aspect 63: An apparatus for wireless communication at a first UE, comprising at least one processor; memory coupled with the at least one processor, the memory storing instructions executable by the processor to cause the apparatus to perform a method of any of aspects 29 through 40.

Aspect 64: An apparatus for wireless communication at a first UE, comprising at least one means for performing a method of any of aspects 29 through 40.

Aspect 65: A non-transitory computer-readable medium storing code for wireless communication at a first UE, the code comprising instructions executable by at least one processor to perform a method of any of aspects 29 through 40.

Aspect 66: An apparatus for wireless communication at a first UE, comprising at least one processor; memory coupled with the processor, the memory storing instructions executable by the processor to cause the apparatus to perform a method of any of aspects 41 through 59.

Aspect 67: An apparatus for wireless communication at a first UE, comprising at least one means for performing a method of any of aspects 41 through 59.

Aspect 68: A non-transitory computer-readable medium storing code for wireless communication at a first UE, the code comprising instructions executable by at least one processor to perform a method of any of aspects 41 through 59.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, including future systems and radio technologies, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:

transmitting, to a set of user equipments (UEs), an indication of a relay configuration for the set of UEs, the relay configuration associated with a set of physical data channel occasions and a corresponding set of physical control channel occasions, wherein each physical data channel occasion of the set of physical data channel occasions is assigned to a respective UE of the set of UEs, and wherein the set of UEs comprises a first UE for transmitting a data packet and one or more second UEs for relaying the data packet;

monitoring one or more physical data channel occasions of the set of physical data channel occasions after transmitting the indication of the relay configuration;

receiving, based at least in part on the monitoring, the data packet from a UE of the set of UEs during a physical data channel occasion of the set of physical data channel occasions; and transmitting, based at least in part on receiving the data packet, a positive acknowledgement for the data packet to the set of UEs during a physical control channel occasion of the set of physical control channel occasions, the physical control channel occasion corresponding to the physical data channel occasion, wherein the positive acknowledgement indicates that the relay configuration is deactivated for the data packet.

2. The method of claim 1, wherein transmitting the indication of the relay configuration comprises:
transmitting semi-persistent scheduling information for the set of physical data channel occasions, the set of physical control channel occasions, or both.

3. The method of claim 2, wherein transmitting the scheduling information comprises:
transmitting an indication of a periodicity associated with the set of physical data channel occasions, an indication of a temporal spacing between each physical data channel occasion of the set of physical data channel occasions and a corresponding physical control channel occasion of the set of physical control channel occasions, or both.

4. The method of claim 3, further comprising:
identifying a priority associated with the data packet, wherein the periodicity is based at least in part on the priority.

5. The method of claim 2, wherein transmitting the scheduling information comprises:
transmitting a radio resource control message or a media access control-control element that comprises at least a portion of the scheduling information.

6. The method of claim 2, wherein the scheduling information comprises an indication of a quantity of iterations for relaying the data packet, each iteration of the quantity of iterations comprising a respective attempt to transmit the data packet by each UE of the set of UEs.

7. The method of claim 1, wherein transmitting the positive acknowledgement comprises broadcasting or group casting the positive acknowledgement to the set of UEs.

8. The method of claim 1, further comprising:
transmitting to the set of UEs, after transmitting the indication of the relay configuration, an activation message for the relay configuration and the data packet; and
commencing the monitoring after transmitting the activation message.

9. The method of claim 8, wherein the activation message comprises a control information message configured to activate the relay configuration for the set of UEs.

10. The method of claim 8, wherein:
transmitting the indication of the relay configuration to the set of UEs comprises transmitting the indication of the relay configuration to a superset of UEs that comprises the set of UEs and one or more additional UEs; and
the activation message comprises an indication of the set of UEs, the one or more second UEs for relaying the data packet, or both.

11. The method of claim 8, further comprising:
selecting, from a set of relay modes, a relay mode for the one or more second UEs, wherein the activation message comprises an indication of the relay mode for the one or more second UEs.

12. The method of claim 11, wherein the relay mode comprises a first relay mode according to which a second UE of the one or more second UEs is to relay the data packet during a respective physical data channel occasion for the second UE based at least in part on a successful decode of the data packet by the second UE during a prior physical data channel occasion.

13. The method of claim 11, wherein the relay mode comprises a second relay mode according to which a second UE of the one or more second UEs is to relay signaling received by the second UE during a prior physical uplink data channel occasion without attempting to decode the received signaling.

14. The method of claim 8, further comprising:
selecting, from a set of relay modes, a respective relay mode for each second UE of the one or more second UEs, wherein the activation message comprises an indication of the respective relay mode for each second UE.

15. The method of claim 8, further comprising:
transmitting, based at least in part on receiving the data packet, a second activation message for the relay configuration and a second data packet.

16. The method of claim 8, further comprising:
failing to successfully decode the data packet after a plurality of physical data channel occasions that comprises a respective physical data channel occasion for each UE of the set of UEs; and
transmitting, based at least in part on failing to successfully decode the data packet after the plurality of physical data channel occasions, a second activation message for the relay configuration and the data packet.

17. The method of claim 8, further comprising:
transmitting, after transmitting the activation message, a second activation message for the relay configuration, wherein the second activation message is for a second data packet or the data packet, and wherein the second activation message indicates a different order of transmission for the one or more second UEs, a different set of UEs, or both relative to the activation message.

18. The method of claim 1, further comprising:
receiving signaling from the first UE during a first physical data channel occasion of the set of physical data channel occasions, the first physical data channel occasion before the physical data channel occasion during which the wireless device receives the data packet;
failing to obtain the data packet based on the signaling received from the first UE during the first physical data channel occasion; and
transmitting, based at least in part on failing to obtain the data packet based on the signaling received from the first UE during the first physical data channel occasion, a negative acknowledgement for the data packet to the set of UEs during a first physical control channel occasion of the set of physical control channel occasions, wherein the first physical control channel occasion corresponds to the first physical data channel occasion, and wherein the negative acknowledgement indicates that the relay configuration remains activated for the data packet.

19. A method for wireless communication at a first user equipment (UE), comprising:
receiving, from a wireless device, an indication of a relay configuration for a set of UEs that comprises the first UE and one or more second UEs for relaying a data packet, wherein the relay configuration is associated with a set of physical data channel occasions and a corresponding set of physical control channel occasions, and wherein each physical data channel occasion of the set of physical data channel occasions is assigned to a respective UE of the set of UEs;

transmitting, during a first physical data channel occasion of the set of physical data channel occasions, the data packet to the wireless device and the one or more second UEs based at least in part on the relay configuration; and receiving, from the wireless device, a positive acknowledgement for the data packet during a physical control channel occasion of the set of physical control channel occasions, wherein the positive acknowledgement indicates that the relay configuration is deactivated for the data packet.

20. The method of claim 19, wherein receiving the indication of the relay configuration comprises:

receiving semi-persistent scheduling information for the set of physical data channel occasions, the set of physical control channel occasions, or both.

21. The method of claim 20, wherein receiving the scheduling information comprises:

receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

22. The method of claim 20, wherein receiving the scheduling information comprises:

receiving a radio resource control message or a media access control-control element that comprises at least a portion of the scheduling information.

23. The method of claim 19, further comprising:

receiving from the wireless device, after receiving the indication of the relay configuration, an activation message for the relay configuration and the data packet, wherein transmitting the data packet is based at least in part on receiving the activation message.

24. The method of claim 23, further comprising:

receiving a second activation message for the relay configuration and a second data packet.

25. The method of claim 23, further comprising:

receiving, for each of the one or more second UEs, a negative acknowledgement for a corresponding physical data channel occasion of the set of physical data channel occasions; and receiving, after receiving the negative acknowledgement for the corresponding physical data channel occasion for each of the one or more second UEs, a second activation message for the relay configuration and the data packet.

26. The method of claim 19, further comprising:

receiving, from the wireless device, a negative acknowledgement for the data packet during a first physical control channel occasion of the set of physical control channel occasions, wherein the first physical control channel occasion corresponds to the first physical data channel occasion, and wherein the negative acknowledgement indicates that the relay configuration remains activated for the data packet.

27. A method for wireless communication at a second user equipment (UE), comprising:

receiving, from a wireless device, an indication of a relay configuration for a set of UEs that comprises a first UE for transmitting a data packet and one or more second UEs for relaying the data packet, the second UE included in the one or more second UEs, wherein the relay configuration is associated with a set of physical data channel occasions and a corresponding set of physical control channel occasions, and wherein each physical data channel occasion of the set of physical data channel occasions is assigned to a respective UE of the set of UEs;

receiving, from the first UE or another second UE of the one or more second UEs, first signaling associated with the data packet during a first physical data channel occasion of the set of physical data channel occasions;

receiving, from the wireless device, a negative acknowledgment for the data packet during a first physical control channel occasion of the set of physical control channel occasions, the first physical control channel occasion corresponding to the first physical data channel occasion; and transmitting, to the wireless device during a second physical data channel occasion of the set of physical data channel occasions, second signaling associated with the data packet based at least in part on receiving the negative acknowledgement, wherein the second signaling is based at least in part on the first signaling.

28. The method of claim 27, wherein receiving the indication of the relay configuration comprises:

receiving semi-persistent scheduling information for the set of physical data channel occasions, the set of physical control channel occasions, or both.

29. The method of claim 28, wherein receiving the scheduling information comprises:

receiving an indication of a periodicity associated with the set of physical data channel occasions, an indication of a temporal spacing between each physical data channel occasion of the set of physical data channel occasions and a corresponding physical control channel occasion of the set of physical control channel occasions, or both.

30. An apparatus for wireless communication at a wireless device, comprising:

at least one processor, memory coupled with the at least one processor, the memory storing instructions executable by the at least one processor to cause the apparatus to:

transmit, to a set of user equipments (UEs), an indication of a relay configuration for the set of UEs, the relay configuration associated with a set of physical data channel occasions and a corresponding set of physical control channel occasions, wherein each physical data channel occasion of the set of physical data channel occasions is assigned to a respective UE of the set of UEs, and wherein the set of UEs comprises a first UE for transmitting a data packet and one or more second UEs for relaying the data packet;

monitor one or more physical data channel occasions of the set of physical data channel occasions after transmitting the indication of the relay configuration;

receive, based at least in part on the monitoring, the data packet from a UE of the set of UEs during a physical data channel occasion of the set of physical data channel occasions; and transmit, based at least in part on receiving the data packet, a positive acknowledgement for the data packet to the set of UEs during a physical control channel occasion of the set of physical control channel occasions, the physical control channel occasion corresponding to the physical data channel occasion, wherein the positive acknowledgement indicates that the relay configuration is deactivated for the data packet.

\* \* \* \* \*